United States Patent [19]

Batzler et al.

[11] Patent Number: 5,157,236
[45] Date of Patent: Oct. 20, 1992

[54] ADAPTIVE PULSE MODE GAS METAL ARC WELDING CONTROL

[75] Inventors: Todd G. Batzler; Jon O. Reynolds, both of Appleton, Wis.

[73] Assignee: Miller Electric Mfg. Co., Appleton, Wis.

[21] Appl. No.: 501,278

[22] Filed: Mar. 29, 1990

[51] Int. Cl.⁵ .............................................. B23K 9/09
[52] U.S. Cl. ........................... 219/130.51; 219/137 PS
[58] Field of Search ...................... 219/130.51, 137 PS, 219/130.33

[56] References Cited

U.S. PATENT DOCUMENTS

| | | | |
|---|---|---|---|
| 3,896,287 | 7/1975 | Cook | 219/131 |
| 4,409,465 | 10/1983 | Yamamoto et al. | 219/137 PS |
| 4,620,082 | 10/1986 | Graville et al. | 219/130.51 |
| 4,758,707 | 7/1988 | Ogilvie et al. | 219/130.51 |

FOREIGN PATENT DOCUMENTS 62-259674 11/1987 Japan .............................. 219/130.51

*Primary Examiner*—Clifford C. Shaw
*Attorney, Agent, or Firm*—Foley & Lardner

[57] ABSTRACT

The present invention provides a GMAW control system for balancing wire burnoff rate with wire feed speed at a weld site. A power source applies a pulsed current to the consumable wire. The width of the peak pulse current is calculated and adapted to maintain a constant optimum arc length as selected by the operator. The controller provides a reference voltage to the power source and the power source provides the pulsed current having a magnitude responsive to the reference voltage signal.

21 Claims, 12 Drawing Sheets

ADAPTIVE PULSE MODE GAS METAL ARC WELDING CONTROL

BACKGROUND OF THE INVENTION

1. Technical Field

The present invention relates, generally, to methods and apparatus for controlling the burnoff rate of a consumable wire electrode in an arc welding process, and more particularly, to an adaptive controller for supplying a pulsed voltage reference train to a voltage controlled arc welding power source such that the wire burnoff rate follows the apparent wire feed rate.

2. Background Art and Technical Problems

Hand-held welding tools configured to cooperate with a power source and a controller are generally well known. In the gas metal arc welding (GMAW) process, a consumable wire electrode is fed to the weld site by a wire feeding mechanism configured to cooperate with a hand-held tool. In such systems, a first electrical contact extends from the power source to the workpiece such that the workpiece functions as a cathode. A second electrical contact extends from the power source to the consumable wire electrode so that the wire functions as an anode.

The power source supplies current to the wire, which current traverses the gap between the workpiece and the wire, forming a plasma column therebetween. This plasma column is sometimes referred to as an "arc"; the voltage difference between the workpiece and the wire electrode is referred to as the arc voltage. A shielding gas, for example 2% oxygen and 98% argon, is fed through the wire feed conduit to the welding site to shield the arc from the atmosphere.

At arc current and voltage levels above a predetermined threshold, spheres of molten metal are melted off the end of the wire electrode, travel through the arc plasma column and are deposited onto a melt puddle at the weld site. The rate at which molten metal is exhausted from the wire electrode is a function of power dissipated at the arc, where power is equal to the product of voltage and current. Inasmuch as a relatively constant voltage is maintained across the arc, the rate of wire consumption is generally a function of arc current.

The quality of the weld is largely determined by the amount of heat generated within the plasma column. To avoid excessive workpiece deformation, it is desirable to minimize arc current while maintaining sufficient power dissipation at the end of the wire electrode to ensure an adequate supply of molten metal to the weld site. Thus, a frequency modulated pulsed current train is supplied to the arc, through the consumable wire, by the power source.

The power source generates the pulse train in response to a voltage reference signal supplied thereto from the controller. The controller modulates the frequency of the reference signal supplied to the power source, thereby controlling the frequency of the current pulse train and, hence, the amount of heat generated at the wire. See, for example, Cook U.S. Pat. No. 3,896,287 issued Jul. 22, 1975, and Yamamoto et al. U.S. Pat. No. 4,409,465 issued Oct. 11, 1983.

Presently known GMAW control systems are unsatisfactory in several regards. In a typical GMAW process employing pulsed current control, five principal parameters influence the burnoff rate at the weld site: (1) frequency of the current pulse train delivered to the wire electrode; (2) peak current amplitude; (3) background current amplitude; (4) peak pulse width (and, hence, background pulse width); and (5) wire feed rate. Welding systems which control wire feed rate or, alternatively, systems predicated on a constant feed rate, typically require a dedicated controller. Consequently, a particular welding tool may only be used with a particular power source, reducing flexibility and efficiency.

Presently known control systems also do not provide satisfactory transient process control prior to steady state operation, i.e., during arc initiation.

SUMMARY OF THE INVENTION

The present invention provides a GMAW control system for balancing wire burnoff rate with wire feed speed at a weld site. In accordance with a preferred embodiment of the invention, a power source applies a pulsed current signal to the consumable wire, which current signal is calculated to maintain a constant optimum arc length as determined by the operator. The controller provides a reference voltage signal to the power source in accordance with programmed variables, operator input parameters, and a feedback signal indicative of wire feed rate.

BRIEF DESCRIPTION OF THE DRAWINGS

Preferred exemplary embodiments of the present invention will hereinafter be described in conjunction with the appended drawings, wherein like designations denote like elements, and.

DETAILED DESCRIPTION OF PREFERRED EXEMPLARY EMBODIMENTS

Figure 1:
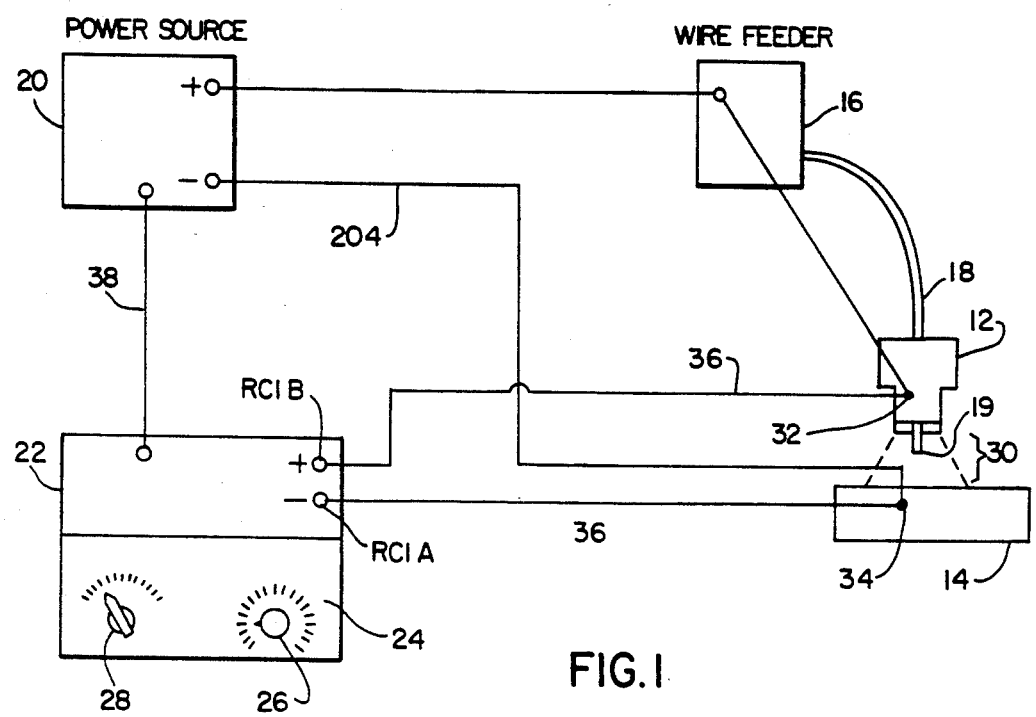
FIG. 1 is a schematic representation of a power source, workpiece, welding tool, wire feeder and controller according to a preferred embodiment of the present invention.

Referring now to FIG. 1, a gas metal arc welding (GMAW) system 10 for use in a preferred embodiment of the present invention includes a hand-held welding tool 12 and a wire feeding mechanism 16 configured to continuously feed a wire electrode 18 to tool 12 for subsequent application, in a molten state, to a workpiece 14. A power source, for example a current source 20, provides a pulsed current signal to wire electrode 18 in response to a reference voltage signal supplied to power source 20 by a controller 22.

Controller 22 houses the control circuitry for implementing the welding process of the present invention. Controller 22 comprises an operator input panel 24, upon which an arc length selector knob 26 and a program selector switch 28 are mounted. Program selector switch 28 is manipulated by the operator to select a program. Selection of a program establishes various operating parameters programmed into the control circuitry of controller 22, as discussed in greater detail below. Each of a plurality of programs, for example ten, correspond to a particular combination of wire size (diameter), wire material, wire feed rate and shielding gas.

An exemplary power source 20 comprises an Arc Pak model 350 manufactured by the Miller Electric Manufacturing Company of Appleton, Wis. An exemplary wire feed unit 16 may comprise a model S-52D or S-54D by the same manufacturer; welding tool 12 may comprise a model GA-20C hand-held welding tool, also by the same manufacturer.

During operation of system 10, an operator guides tool 12 along a weld path while attempting to maintain an approximately constant distance between tool 12 and workpiece 14. However, because of such factors as, for example, varying wire feed rate, operator skill level, and power supply response time, the instantaneous distance between the distal end 19 of wire 18 and the surface of workpiece 14 tends to change over time.

Figure 3:
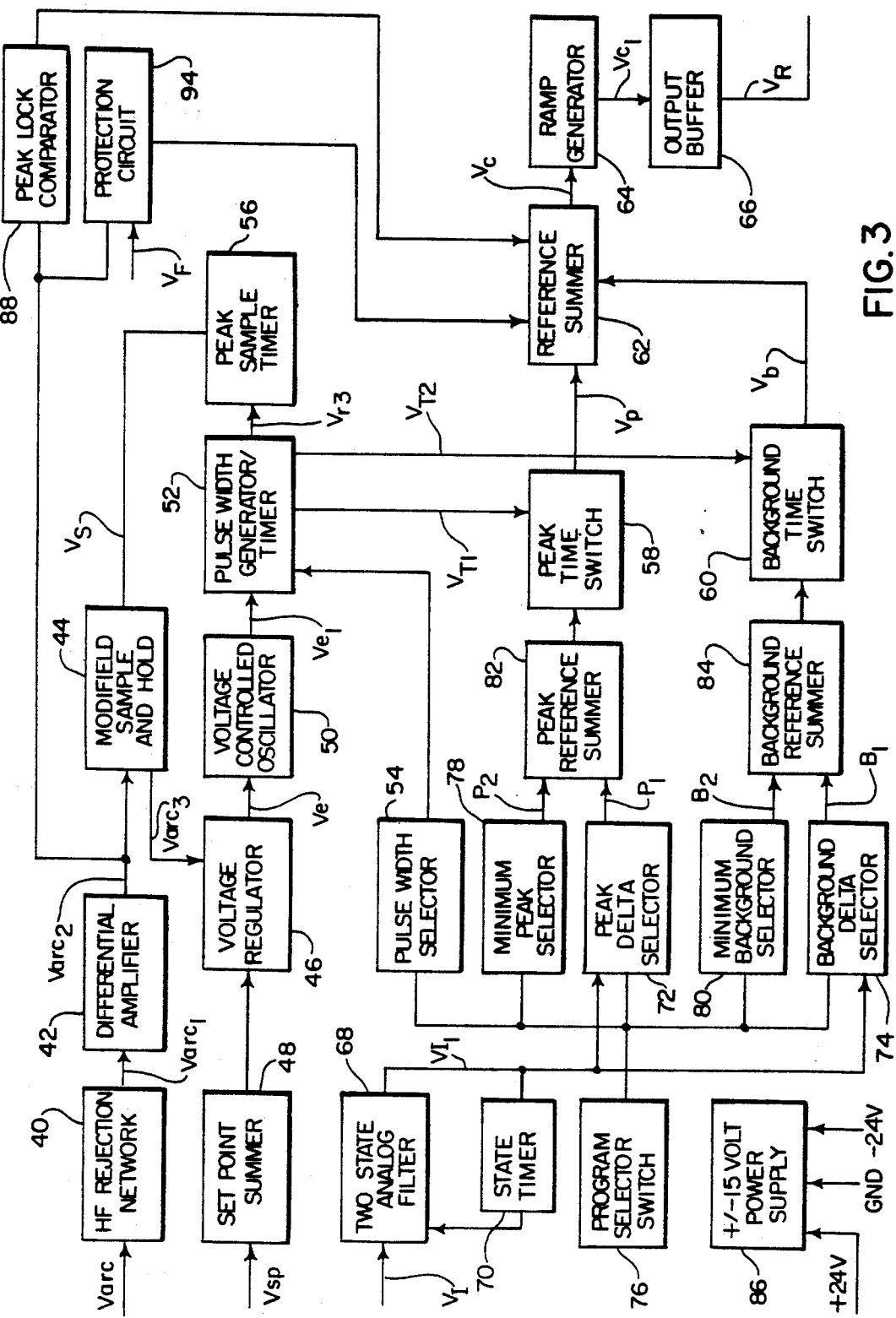
FIG. 3 is a schematic flow diagram of the operation of the controller according to the present invention.

Referring now to FIGS. 1 and 3, it is known that a substantially constant ohmic resistivity exists within an arc region 30 defined by workpiece 14 and distal end 19 of wire 18. Thus, the arc voltage Varc across arc 30 fluctuates about a desired arc voltage Vsp as a result of variations in arc length. Controller 22 monitors arc voltage Varc and provides a reference signal $V_R$ to power source 20.

In response to reference signal $V_R$, power source 20 supplies a pulsed current signal to wire 18. The magnitude of the pulsed current signal is calculated to drive arc voltage Varc in the direction of desired arc voltage Vsp which, in the preferred embodiment, is selected by the operator via selector 26.

Arc voltage Varc is advantageously measured between a first electrode 32, connected to tool 12 and in contact with wire 18, and a second electrode 34 disposed for electrical contact with workpiece 14. Respective voltage sensing leads 36 communicate the voltaic potentials at respective electrodes 34, 32 to respective pins RC1A and RC1B of controller 22.

Figure 2:
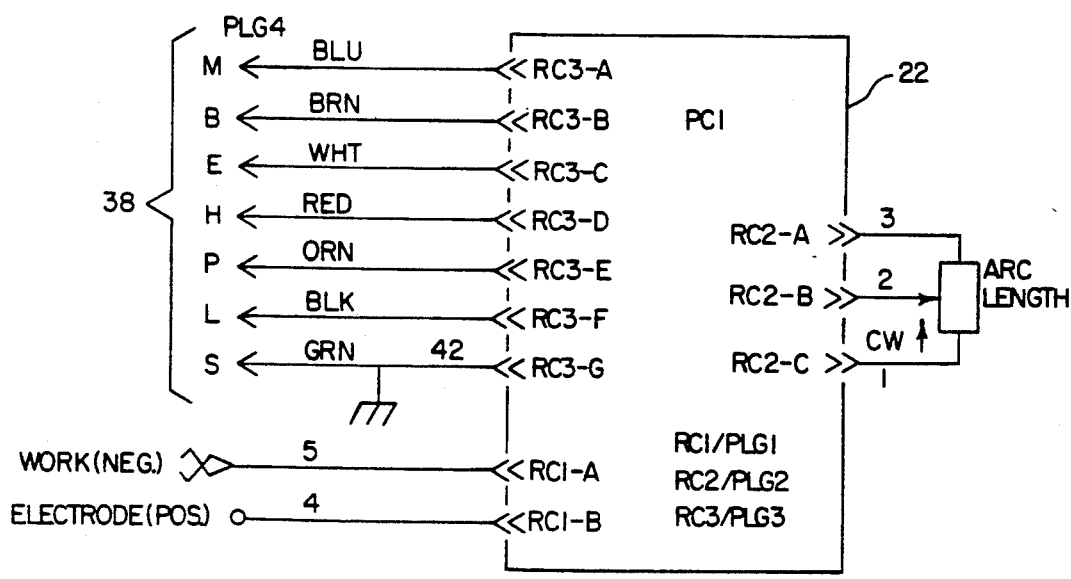
FIG. 2 is a schematic representation of the inputs and outputs to the controller according to the present invention.

Referring now to FIGS. 1 and 2, an umbilical cord 38, comprising a plurality of wire connectors, is configured to maintain electrical communication between power source 20 and controller 22. Cord 38 preferably includes an arc voltage failure lead RC3-A, a reference command lead RC3B, a current feedback lead RC3C, respective positive and negative DC voltage leads RC3D and RC3F, a circuit common lead RC3E, and a chassis shunt lead RC3G.

Controller 22 further comprises respective arc length selection leads RC2-A, RC2-B, and RC2-C, discussed in greater detail below in connection with their associated circuit components.

Referring now to FIG. 3, the voltage difference between workpiece 14 and wire 18 is supplied to controller 22 via a high frequency (HF) rejection network 40 wherein extraneous electrical noise is filtered from the voltage signal. Because arc voltage Varc is measured at the work site, respective first and second electrodes 32, 34 and remote sensing leads 36 are subject to extraneous radiation at the work site. Such radiation may be produced by, for example, adjacent machinery, particularly high frequency arc welders. Controller 22, on the other hand, is often remotely located from the work site, possibly up to twenty-five to one hundred feet or more from the operator and, thus, is less susceptible to extraneous radiation. HF rejection network 40 removes such high frequency noise from the signal comprising arc voltage Varc.

In the illustrated embodiment, remote voltage sensing leads 36 are electrically connected to wire electrode 18 and workpiece 14 proximate the weld site. In an alternate preferred embodiment, remote sensing leads 36 are eliminated and the arc voltage is measured at power source 20. More particularly, a workpiece sensing lead 204 may extend from workpiece 14 to controller 20. The difference between the workpiece voltage and the voltage applied to wire 18 at controller 20 is determined and applied to controller 22 as arc voltage Varc. This alternate configuration permits the determination of Varc without the need for remote voltage sensing leads 36.

HF rejection network 40 outputs a first iteration arc voltage $Varc_1$. First iteration arc voltage $Varc_1$ is applied to a differential amplifier 42. Differential amplifier 42 determines the difference between the workpiece voltage and the wire voltage to obtain a second iteration arc voltage $Varc_2$. As discussed in greater detail below, second iteration arc voltage $Varc_2$ is generally a function of reference signal $V_R$ and, thus, comprises a cyclic signal having respective alternating peak and a background amplitude portions.

Second iteration arc voltage $Varc_2$ is applied to a modified sample and hold circuit 44. Sample and hold circuit 44 samples the peak value of second iteration arc voltage $Varc_2$ once during each cycle of arc voltage Varc and temporarily stores the sampled peak value for the duration of that sample's cycle, as explained in greater detail below. A peak sample timer 56 synchronizes sample and hold circuit 44 to the peak to background transition of each cycle of arc voltage Varc to ensure that the sample is taken during the relevant portion of each cycle of arc voltage Varc, namely, the peak portion. Sample and hold circuit 44, in effect, converts the pulsed signal comprising second iteration arc voltage $V_{arc_2}$ into a third iteration arc voltage $V_{arc_3}$ comprising an analog signal representative of the peak value of the arc voltage $V_{arc}$. Third iteration arc voltage $V_{arc_3}$ is then applied as a first input to a voltage regulator 46.

The desired arc voltage $V_{sp}$ is selected by the operator via arc length selector knob 26 (FIG. 1). In this context, the desired (and actual) arc length is presumed to be linearly proportional to arc voltage $V_{arc}$ since the arc region exhibits a constant resistivity. Thus, arc length may be conveniently controlled by varying the arc voltage $V_{arc}$, as described herein.

The desired arc voltage $V_{sp}$ is applied to a set point summer 48. Set point summer 48 steps up the desired arc voltage $V_{sp}$ by a predetermined amount to ensure that the welding process is performed above a predetermined threshold voltage level. The output of set point summer 48 is applied as a second input to a voltage regulator 46. Voltage regulator 46 compares the output of set point summer 48 to third iteration arc voltage $V_{arc_3}$ (from sample hold circuit 44) and generates an error signal $V_e$ representative of the difference between the desired arc voltage $V_{sp}$ and the (actual) arc voltage $V_{arc}$.

Error signal $V_e$ is applied to a voltage controlled oscillator 50 and converted to a first iteration error signal $V_{e_1}$. The frequency of first iteration error signal $V_{e_1}$ is proportional to the output of voltage regulator 46. As the error signal $V_e$ applied to oscillator 50 increases, indicating a large difference between the actual arc voltage $V_{arc}$ and the desired arc voltage $V_{sp}$, the output frequency of oscillator 50 changes to alter the burnoff rate of wire 18 at the weld site in a manner tending to reduce error signal $V_e$ to zero.

As stated earlier, the system of the present invention focuses on five principal parameters in determining the burnoff rate in a pulsed GMAW process: pulse frequency; peak width (and, thus, background width); peak amplitude; background amplitude; and wire feed rate. In the preferred embodiment of the present invention, pulse frequency modulation is the dependent variable for purposes of control manipulation. Each of these five parameters must be defined for reference signal $V_R$. Upon transmission of first iteration error signal $V_{e_1}$ from oscillator 50, only the frequency of the signal is defined.

First iteration error signal $V_{e_1}$ is applied as a first input to a pulse width generator 52. Pulse width generator 52 receives a second input from a pulse width selector 54, discussed below.

First iteration error signal $V_{e_1}$ is a fifty percent duty cycle signal. That is, the peak portion of each cycle is equal in length (duration) to the background portion of the same cycle.

Pulse width generator 52 converts first iteration error signal $V_{e_1}$ into a second iteration error signal $V_{e_2}$.

Second iteration error signal $V_{e_2}$ is a pulse width modulated signal, i.e., the width of the peak portion of a cycle is generally greater than the width of the background portion of the same cycle as determined by pulse width selector 54.

Pulse width selector 54 selects the appropriate peak width, based on predetermined program values stored therein, as a function of the position of program selector switch 28 (FIG. 1), as discussed in greater detail below. By selecting the peak width for a given frequency, pulse width 54 necessarily determines the background width at the same time.

Pulse width generator 52 provides a first timing signal $V_{T1}$ to a peak time switch 58 and a second timing signal $V_{T2}$ to a background time switch 60. In response to these signals, peak time switch 58 applies a peak amplitude signal $V_p$ to a reference summer circuit 62 for an amount of time representative of the peak pulse width; background time switch 60 applies a background amplitude signal $V_b$ to reference summer 62 for an amount of time representative of the background pulse width for each cycle of first iteration error signal $V_{e_1}$.

Pulse width generator 52 applies a third timing signal $V_{T3}$ to a peak sample timer 56, discussed in greater detail below.

Peak time switch 58 and background time switch 60 function as gates which selectively apply the peak and background amplitude signals $V_p$ and $V_b$, respectively, to reference summer 62. Reference summer 62 combines peak and background amplitude signals $V_p$ and $V_b$ and produces a composite signal $V_c$. $V_c$ is preferably a square wave signal having the following defined parameters: frequency, peak width, peak amplitude, background width, and background amplitude.

For reasons discussed more fully below, application of a square wave current pulse to wire 18 does not always promote optimum weld formation. Rather, gradual transitions between the peak and backround amplitudes are generally preferred. Thus, the square wave composite signal $V_c$ is applied to a ramp generator 64 to effect a gradual rate of change between the peak and background amplitudes associated with composite signal $V_c$. Ramp generator 64 applies a first iteration composite signal $V_{c_1}$ to an output buffer 66. Output buffer 66 augments the drive capability of first iteration composite signal $V_{c_1}$ and outputs reference signal $V_R$ to power source 20.

A principal feature of the preferred embodiment of the present invention is the ability of control system 10 to monitor and compensate for variations in wire feed rate without controlling wire feed rate. That is, wire feed rate is inferred from the average current at arc 30, based on the principle that the rate at which molten metal is liberated from wire 18 is a function of the amount of energy applied to wire 18.

In a general sense, wire feed rate relates to the time rate of change of the distance between distal end 19 of wire 18 and the weld surface. Thus, even assuming that the wire feeder 16 urges wire 18 through tool 12 at a constant rate, the position of tool 12 relative to workpiece 14 inevitably changes, for example, as a result of movement of the operator's hand. As the operator's hand drifts or jerks toward and away from the weld surface, the apparent wire feed rate (as viewed from the weld surface) changes accordingly.

To the extent the length of arc 30 can be held constant, the apparent wire feed rate also remains constant. In the closed loop system of the present invention, arc voltage and, equivalently, arc length, are maintained at an approximately constant level. That being the case, the rate at which metal is burned off wire electrode 18 is essentially a function of the average current through wire 18. The area under the "peaks" of reference signal $V_R$ represent discrete packets (quanta) of heat energy.

The rate at which successive quanta of heat are applied to wire 18 is primarily controlled through frequency modulation. Inasmuch as the magnitude of arc current $V_{arc}$ is a fairly accurate gauge of wire feed rate, apparent wire feed rate may be determined indirectly by monitoring the current in wire 18.

In addition to frequency modulation, the system of the present invention also employs amplitude modulation as a means of controlling the current in wire 18. With continued reference to FIG. 3, peak and background time switches 58 and 60 apply peak and background signals $V_p$ and $V_b$ to reference summer 62. The mechanism by which the magnitudes of the peak and background amplitudes are determined will now be described.

The pulsed current signal applied to wire 18 by power source 20 is monitored at the power source and fed back to controller 22. More particularly, a feedback signal $V_I$, representative of the current transmitted through wire 18 by power source 20, is applied to controller 22 at a two state filter 68. A state timer 70 is configured to manipulate filter 68 between a first mode of operation (the first state), corresponding to steady state control of the welding process, and a second mode of operation (the second "state" of two state filter 68) corresponding to arc initiation, as described in greater detail below.

Two state filter 68 manipulates feedback signal $V_I$ and generates a first iteration feedback signal $VI_1$ representative of the average value of the peak and background portions of the current applied to wire 18 by power source 20.

During steady state operation, a first iteration feedback signal $VI_1$ is derived at analog filter 68 and applied to a peak delta selector 72 and a background delta selector 74. A program selector 76 communicates program parameters, according to the position of program selector switch 28, to various control components, including peak delta selector 72, background delta selector 74, pulse width selector 54, peak minimum selector 78, and background minimum selector 80. Based on a particular position of program selector switch 28, each of the foregoing components selects one or more predetermined output parameters.

For example, for a particular program selection, peak delta selector 72 applies a first peak signal $P_1$ to a peak reference summer 82. First peak signal $P_1$ establishes a predetermined maximum rate of change of peak amplitude signal $V_p$ during the steady state welding process. Similarly, minimum peak selector 78 applies a second peak signal $P_2$ to peak reference summer 82. Second peak signal $P_2$ establishes a predetermined minimum value of peak amplitude signal $V_p$ to ensure satisfactory weld quality.

First peak signal $P_1$ (from peak delta selector 72) is added to second peak signal $P_2$ (from minimum peak selector 78) at peak reference summer 82. The output of peak reference summer 82, which represents the magnitude of peak amplitude signal $V_p$, is applied to peak time switch 58.

Analogously, for a particular program selected by program selector 76, background delta selector 74 applies a first background signal $B_1$ to a background reference summer 84. First background signal $B_1$ establishes a maximum predetermined rate of change of background amplitude signal $V_b$ during the steady state welding process. Minimum background selector 80 applies a second background signal $B_2$ to background reference summer 84. Second background signal $B_2$ establishes a predetermined minimum value of background amplitude signal $V_B$ to prevent the arc current from being extinguished.

First background signal $B_1$ (from background delta selector 74) is added to second background signal $B_2$ (from minimum background selector 80) at background reference summer 84. The output of background reference summer 84, which represents the magnitude of background amplitude signal $V_B$, is applied to background time switch 60.

As previously discussed, peak and background time switches 58 and 60 are responsive to respective first and second timing signals $V_{T1}$ and $V_{T2}$ from pulse width generator 52. In particular, peak time switch 58 selectively applies peak amplitude signal $V_p$ to reference summer 62 according to first timing signal $V_{T1}$. Background time switch 60 selectively applies background amplitude signal $V_B$ to reference summer 62 according to record timing signal $V_{T2}$.

With continued reference to FIGS. 1–3, a power supply circuit 86 receives unregulated DC voltage from power source 20 and steps the DC voltage down to a 15 volt supply used by the control circuitry comprising controller 22.

According to a further aspect of the preferred embodiment of the present invention, controller 22 provides certain features which enhance the performance of arc welding system 10 during transient operations and, particularly, during arc initiation.

In a general sense, controller 10 increases reference signal $V_R$ in response to a low value of arc voltage Varc, and decreases reference signal $V_R$ in response to a high value of arc voltage Varc. In this manner, the actual arc voltage Varc is driven toward the desired arc voltage Vsp. Prior to arc initiation, however, no current flows between wire 18 and workpiece 14 and, thus, an open circuit exists at arc 30.

It has been observed that weld quality is enhanced when the arc is initiated quickly. Thus, it is desirable to increase the arc current from approximately zero amps (prior to arc initiation) to the steady state condition as rapidly as possible. However, it is also desirable to maximize control sensitivity by limiting the value of the arc current to within a narrow operating envelope. Consequently, according to one aspect of the preferred embodiment of the present invention, arc initiation control is divorced from steady state control so that the open circuit condition (zero arc current) lies outside the steady state control envelope.

To facilitate rapid arc initiation, a peak lock comparator 88 monitors second iteration arc voltage $Varc_2$ from differential amplifier 42. Prior to arc initiation, wire 18 is spaced apart from workpiece 14 and no current flows at arc 30. The arc is initiated by contacting wire 18 to workpiece 14, at which point a short circuit is detected across respective sensing leads 36.

During arc initiation, when arc voltage Varc falls below a predetermined threshold, peak lock comparator 88 overrides pulse width generator 52 and drives reference signal $V_R$ to a predetermined maximum voltage until a sustained arc exists. Thereafter, as molten metal is expelled from wire 18, the wire burns free of the workpiece and back toward tool 12, thus entering the steady state mode of operation.

Arc voltage Varc increases as the distance between wire 18 and workpiece 14 increases. When arc voltage Varc reaches a predetermined level indicating that arc initiation is complete, peak lock comparator 88 turns control of reference summer circuit 62 back over to pulse width generator 52 for steady state operation.

With reference now to FIGS. 1–4, remote sensing leads 36 transmit arc voltage Varc from arc 30 to controller 22. More particularly, first electrode 32, operatively connected to tool 12, senses the voltage level at wire 18 and applies that voltage to RC1-pin B of HF rejection network 40. Second electrode 34 transmits the voltage at workpiece 14 to RC1-pin A of HF rejection network 40.

HF rejection network 40 includes respective series inductors RFC1 and RFC2. The inductance values of inductors RFC1 and RFC2 are selected to block out undesired high frequency victim type radiation which may be carried from the weld environment to controller 22 via remote sensing leads 36. These series inductors ("chokes") prevent a substantial portion of the high frequency radiation from entering the control circuitry of controller 22. In addition, capacitors C1, C2, C3 and C4 provide low impedance paths to ground for high frequency energy associated with victim type radiation. Thus, substantially all of the high frequency energy which passes through inductors RFC1, RFC2 is shunted to ground.

HF rejection network 40 further includes a voltage divider comprising resistors R1, R2, R3, and R4, the values of which are selected to scale the value of arc voltage Varc to approximately 1/10 of the value actually measured at arc 30. Thus, whereas the actual voltage at arc 30 may range from zero to approximately eighty to one hundred volts, first iteration arc voltage $Varc_1$ is stepped down to within the range of approximately zero to ten volts.

First iteration arc voltage $Varc_1$ is applied to differential amplifier 42, preferably a unity gain quad 14 pin linear operational amplifier A1. Differential amplifier 42 computes the difference between the voltage at workpiece 14 and from the voltage at wire 18 and outputs second iteration arc voltage $Varc_2$ at pin 8. If the value of second iteration $Varc_2$ is negative, the voltage appearing at pin 8 will also be negative with respect to circuit common; if second iteration $Varc_2$ is positive, amplifier A1 applies a positive voltage with respect to circuit common at pin 8.

Second iteration arc voltage $Varc_2$ is a pulsed signal having alternating peak and background values. Sample and hold circuit 44 converts second iteration $Varc_2$ to third iteration $Varc_3$, which is representative of the peak values of Varc 2 without regard to the background values.

Figure 4:
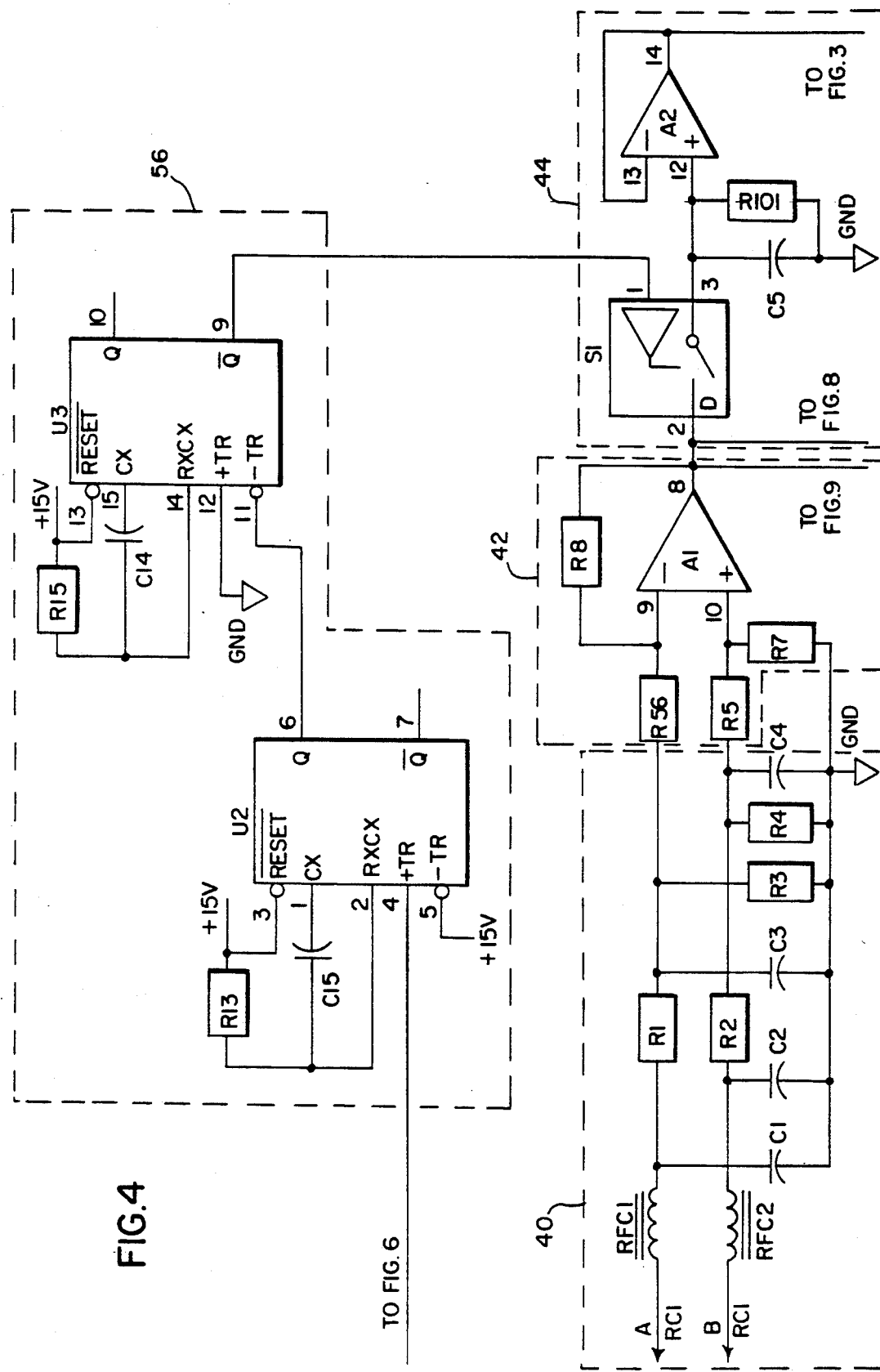
FIG. 4 is an electrical schematic of a high frequency rejection network, a differential amplifier, a modified sample and hold circuit, and a peak sample timer according to the present invention.

Referring now to FIGS. 3 and 4, sample and hold circuit 44 includes a solid state switch S1, such as a dual CMOS interface analog switch. The state of switch S1 is controlled by peak sample timer 56 which, in turn, receives command signals from pulse width generator 52. As discussed in greater detail below, pulse width generator 52 controls peak and background time switches (gates) 58 and 60 to establish the relative widths of the peak and background pulses comprising composite signal $V_c$. In addition, pulse width generator 52 applies third timing signal $V_{T3}$ to sample timer 56, which signal is indicative of the width (duration) of the peak portion of reference signal $V_R$.

At the beginning of the peak portion of each cycle of reference signal $V_R$, as determined by pulse width generator 52, third timing signal $V_{T3}$ is applied to a first processor U2 of peak sample timer 56. Processor U2 outputs a signal to a second processor U3 to initiate a time delay equal to the duration of the ramping function performed by ramp generator 64, discussed in greater detail below. Processors U2 and U3 are preferably sixteen pin, dual in-line port, digital CMOS multivibrator integrated circuits.

At the termination of the foregoing predetermined delay period, processor U3 transmits a signal to close switch S1, enabling the application of a peak sample signal $V_S$ to modified sample and hold circuit 44. At the conclusion of the peak period of each pulse of reference signal $V_R$, as determined by pulse width generator 52, peak sample timer 56 opens switch S1, causing sample and hold circuit 44 to change from the "sample" mode to the "hold" mode of operation.

During the hold mode of operation of sample and hold circuit 44, the value of the sampled voltage is held until the next peak portion of $Varc_2$ occurs, at which point switch S1 closes and a subsequent peak value is again sampled. In this manner, sample and hold circuit 44 converts second iteration arc voltage $Varc_2$, having peak and background values, to the relatively smooth third iteration $Varc_3$. The value of third iteration $Varc_3$ varies according to variations in amplitude of successive sampled peaks of $Varc_2$.

The "hold" circuitry of sample and hold circuit 44 preferably comprises a parallel combination of a capacitor C5 and a resistor R101. The values of capacitor C5 and resistor R101 are selected so that third iteration arc voltage $Varc_3$ is trapped during periods in which switch S1 is open. In this regard, resistor R101 constitutes the "modified" aspect of the "modified sample and hold" circuit 44. That is, an unmodified (pure) sample and hold circuit would trap and hold the precise voltage transmitted through switch S1. Thus, during background time with switch S1 open, the capacitor voltage would not change. The modification (comprising resistor R101) allows the voltage across capacitor C5 to decrease as a function of the time constant defined by resistor R101 and capacitor C5. This feature enhances arc initiation in the following manner.

Prior to arc initiation, the actual voltage across arc 30 is between 80 and 100 volts. The voltage divider circuitry of HF rejection network 40 scales this voltage by a factor of ten, so that the second iteration arc voltage $Varc_2$ at pin 8 of differential amplifier 42 is approximately 8 to 10 volts. This voltage is far in excess of the desired arc voltage Vsp. Consequently, controller 22 will attempt to drive arc voltage Varc down to match the desired arc voltage Vsp by phasing oscillator 50 off.

When wire 18 contacts workpiece 14, the voltage at arc 30 instantaneously drops to zero. In response to this voltage drop, peak lock comparator 88 drives reference signal $V_R$ to a maximum value. Oscillator 50, which remains phased off, must quickly come up to a level compatible with steady state operation. In the absence of resistor R101, the time constant associated with capacitor C5 is essentially infinite. The addition of resistor R101 allows the voltage trapped across capacitor C5 to gradually decrease, thereby reducing the difference between arc voltage $V_{arc}$ and desired arc voltage $V_{sp}$. As a result, the output of oscillator 50 gradually recovers during arc initiation. When arc voltage Varc rises to the predetermined threshold level at which peak lock comparator 88 turns control of reference signal $V_R$ back over to pulse width generator 52, the output of oscillator 50 is close to the steady state operating level.

Sample and hold circuit 44 further comprises a unity gain amplifier A2, similar to amplifier A1 of differential amplifier 42. Amplifier A2 applies an output signal (second iteration arc voltage $Varc_2$) to voltage regulator 46 for comparison with the desired arc voltage Vsp.

Figure 5:
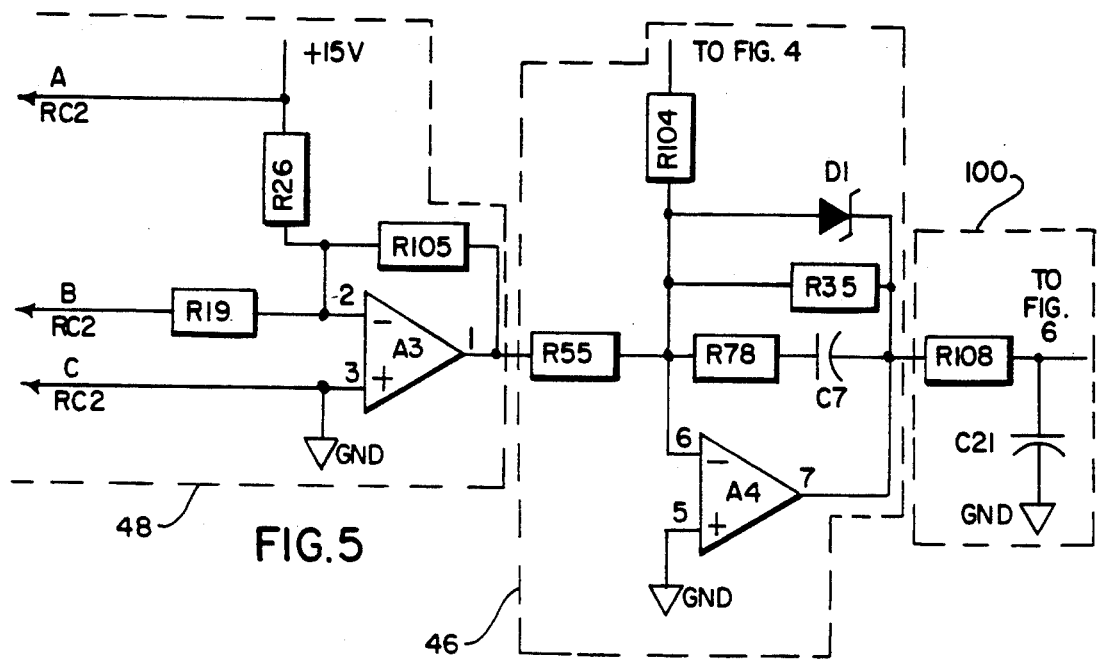
FIG. 5 is an electrical schematic representation of a biased reference summer and a voltage regulator according to the present invention.

Referring now to FIGS. 3 and 5, desired arc voltage $V_{sp}$ enters the control circuitry through set point summer 48. It has been determined that a predetermined minimum arc voltage Varc is required to ensure stable operation of the welding process. Set point summer 48 is configured to ensure that the desired arc voltage Vsp exceeds the minimum arc voltage required to maintain a stable arc regardless of the value of desired arc voltage Vsp set by the operator via arc length selector knob 26. Specifically, a fifteen volt supply voltage is applied at RC2-pin A of set point summer 48. Respective resistors R26 and R105 provide the desired minimum voltage bias at pin 1 of an amplifier A3, which amplifier is equivalent to amplifiers A1 and A2.

As discussed previously, the operator selects a desired arc length (voltage) by manipulating arc length selector knob 26 on panel 24 of controller 22. The position of selector knob 26 is communicated to RC2 pin B of set point summer 48; RC2 pin C is fixed at circuit common. Thus, RC2 pins B and C, in conjunction with arc length selector knob 26, comprise a potentiometer wherein the voltage difference between RC2 pins B and C is established by the operator via selector knob 26. Should the operator select a desired arc voltage (length) Vsp which is less than the minimum value established by resistors R26 and R105, reference summer 48 will shift the selected value of desired arc voltage Vsp upward by the minimum value established by resistors R26 and R105. The desired arc voltage Vsp is then applied to voltage regulator 46 for comparison with arc voltage $Varc_3$.

Voltage regulator 46 comprises zener diode Z1; resistors R55, R104, R35, R78; capacitor C7; and an amplifier A4. Amplifier A4 is equivalent to amplifiers A1, A2, and A3. The values of the resistances and capacitances associated with voltage regulator 46 may be selected to create a compensation network which yields optimum steady state performance. Those skilled in the art will appreciate that optimum performance of controller 22 involves minimizing over-shoot, under-shoot, and hunting, to thereby maintain overall system stability over the desired range of operation. The output (error signal Ve) at pin 7 of voltage regulator 46 comprises an appropriately modified analog signal representative of the error between the desired voltage Vsp and the measured arc voltage Varc.

Figure 6:
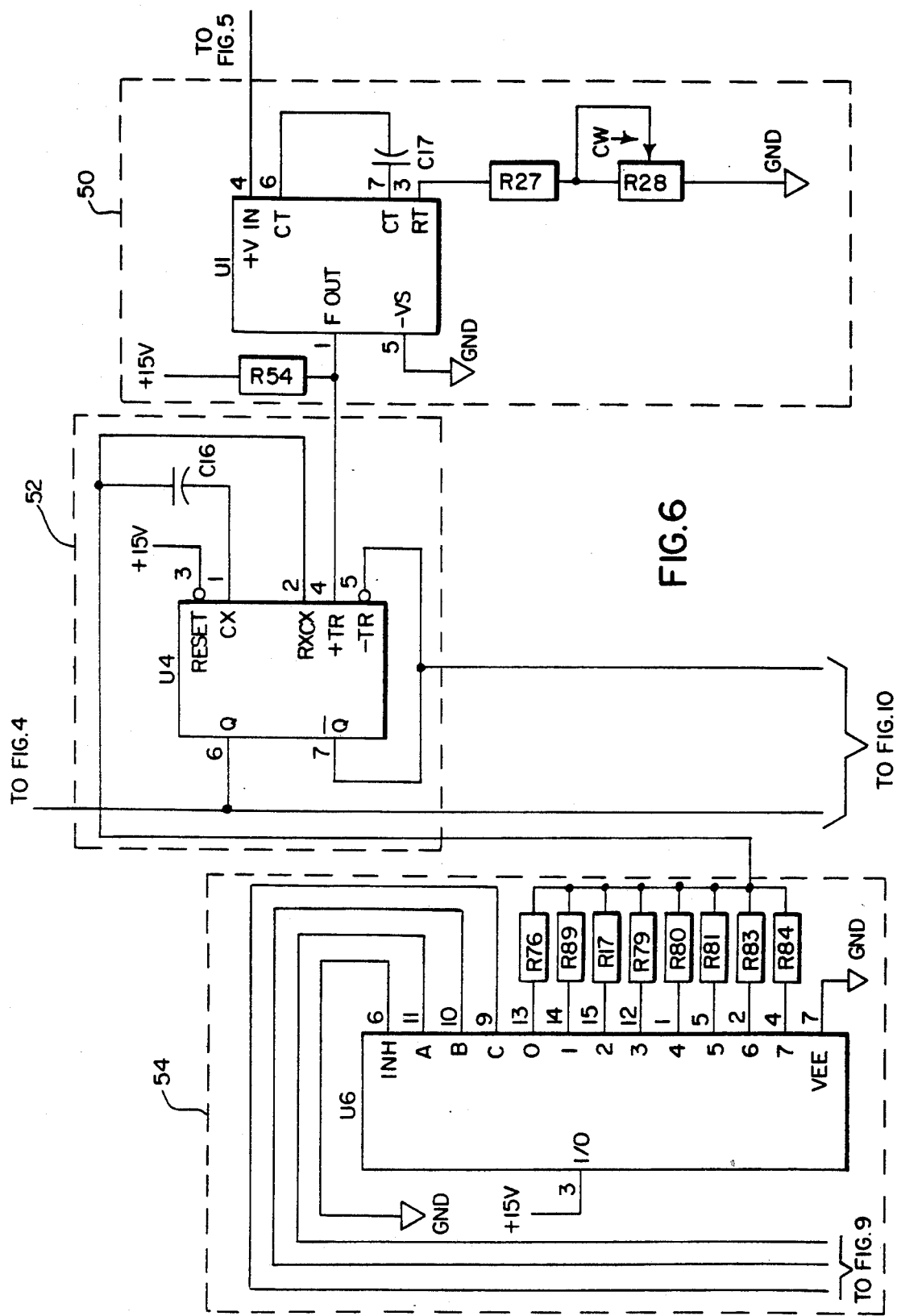
FIG. 6 is an electrical schematic representation of a pulse width selector, a pulse width generator, and a voltage controlled oscillator according to the present invention.

Referring now to FIGS. 3, 5, and 6, an interface circuit 100, preferably comprising a resistor R108 and a capacitor C21, functions as a filter between voltage regulator 46 and oscilator 50. Filter 100 ensures that the rate of change of error signal Ve at pin 7 is compatible with the processing capability of oscillator 50.

Through frequency modulation, error signal Ve from voltage regulator 46 modulates the output of oscillator 50, driving the difference between the desired arc voltage Vsp and the actual (measured) arc voltage to a minimum. That is, if the actual arc voltage Varc exceeds the desired voltage Vsp, the error signal Ve will decrease the frequency of first iteration error signal $Ve_1$, thereby slowing down the burnoff rate of wire 18 until arc voltage Varc equals desired arc voltage Vsp. Similarly, if arc voltage Varc is lower than the desired arc voltage Vsp, the value of error signal Ve will be appropriate to increase the frequency of first iteration error signal $Ve_1$ and, consequently, increase the arc length.

Oscillator 50 includes a voltage-to-frequency (V/F) converter U1. A passive pull-up resistor R54 is employed to pull pin 1 of oscillator 50 up to 15 volts. As a result, the output of oscillator 50 (first iteration error signal $Ve_1$) comprises a square wave having a 15 volt peak amplitude and a zero volt background amplitude at a fifty percent duty cycle. The values of the various electrical components peripheral to V/F converter U1 are selected to yield an optimum range of operating frequencies for first iteration error signal $Ve_1$.

First iteration error signal $Ve_1$ comprises a 50% duty cycle, zero to 15 volt square wave signal representative of the difference between the desired arc voltage Vsp and the measured arc voltage Varc. In the preferred embodiment of the present invention, the frequency of first iteration error signal $Ve_1$ is a linear function of the magnitude of error signal Ve.

Power source 20 is advantageously configured to respond to a reference signal $V_R$ in the range of approximately zero to ten volts. Hence, the peak and background amplitude levels of first iteration error signal $Ve_1$ must be level shifted from zero to fifteen volts to within the range of approximately zero to ten volts.

It is further desirable to modulate the peak portion of reference signal $V_R$ to have a duty cycle greater or less than the background portion, depending on, inter alia, the frequency. The manner in which the width of the peak portion of reference signal $V_R$ relative to the width of the background portion of reference signal $V_R$ is determined, and the manner in which the relative magnitudes of the peak and background portions of reference signal $V_R$ are determined, will now be described.

With reference to FIG. 1, program selector switch 28 is set by the operator to a position corresponding to one of a plurality of predetermined programs. In this context, a program refers to a unique set of operating parameters which are encoded into various of the circuit components comprising controller 22. A printed list of the various programs, for example ten, may be displayed on the surface of controller 22 for ease of reference.

Each program corresponds to a desired set of operating conditions including, for example, wire size (diameter), shielding gas, and a range of wire feed rates. The operator determines the appropriate operating conditions and selects a desired program by setting program selector switch 28, which communicates the program selection to program selector 76.

Referring now to FIGS. 3, 8-10, and 12, selection of a particular program via program selector switch 28 produces a unique three-bit binary signal which calls up appropriate operating parameters programmed into the various control components in a controller 22. A particular combination of shielding gas, wire material, wire diameter and wire feed rate may produce optimum weld characteristics by closely coordinating the peak pulse width, the minimum peak amplitude, the minimum background amplitude, and the rate of change of the peak amplitude and the background amplitude. Each of the aforementioned control subsystems of controller 22, which define the various parameters of reference signal $V_R$, is programmed to generate appropriate operating values corresponding to each program selection.

Program selection circuit 76 transmits a three bit binary signal to pulse width selector 54, which binary signal is established by the particular program selected by the operator using program selector switch 28. Pulse width selector 54 includes a programmable logic array (PLA) U6. PLA U6 may be, for example, an eight (8) channel MUX/DEMUX interface device. PLA U6 generates a signal representative of the desired pulse width for the particular program, and applies this signal to pulse width generator 52.

Pulse width generator 52 applies first timing signal $V_{T1}$ and second timing signal $V_{T2}$ at pins 7 and 6, respectively, of a digital multivibrator (processor) U4. Processor U4 is preferably equivalent to processors U2 and U3. As previously discussed, third timing signal $V_{T3}$ is applied to peak sample timer 56 to control sampling of the peak portion of arc voltage Varc by sample and hold circuit 44.

Pin 6 of processor U4 applies second timing signal $V_{T2}$ to background time switch 60; pin 7 of processor U4 applies first timing signal $V_{T1}$ to peak time switch 58. The respective active states of pin 6 and pin 7 are preferably mutually exclusive.

Figure 10:
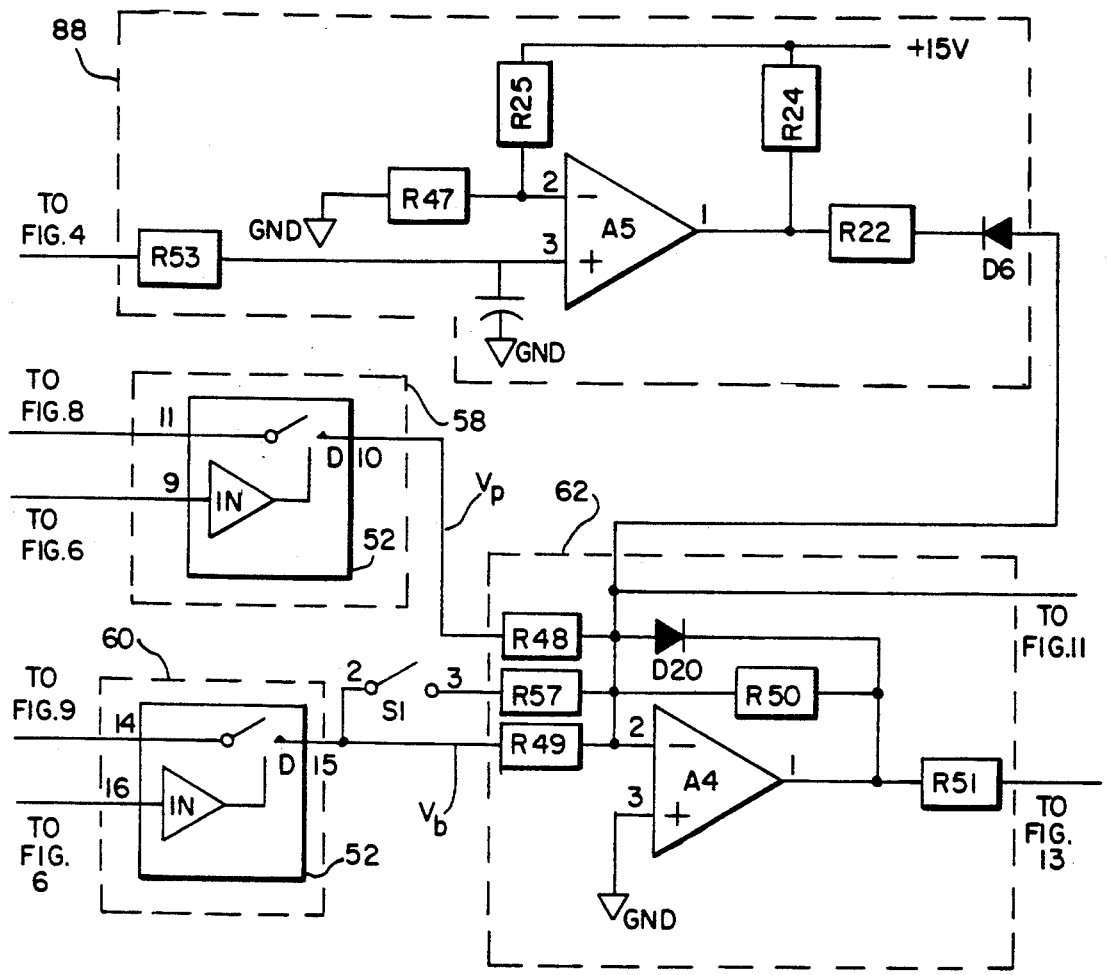
FIG. 10 is an electrical schematic representation of a peak time switch, a background time switch, a reference summer, and peak lock comparator according to the present invention.

Referring now to FIGS. 3 and 10, each of time switches 58 and 60 comprises an integrated circuit switching mechanism S2, such as a dual CMOS interface analog switch. Peak amplitude signal $V_p$ is continuously maintained at pin 11 of peak time switch 58 by peak reference summer 82; background amplitude signal $V_b$ is maintained at pin 14 of background time switch 60 by background reference summer 84. Switches 58 and 60 are selectively opened and closed according to first and second timing signals $V_{T1}$ and $V_{T2}$, which timing signals are generated by pulse width generator 52. As a result, peak amplitude signal $V_p$ is applied to reference summer 62 for a duration corresponding to the peak pulse width; background amplitude signal $V_b$ is applied to reference summer 62 for a duration corresponding to the background pulse width. In response, reference summer 62 combines peak and background amplitude signals $V_p$ and $V_b$ into a composite signal $V_c$ having a square wave characteristic.

During arc initiation, peak lock comparator 88 overrides the application of alternating signals from peak time switch 58 and background time switch 60. Specifically, peak lock comparator 88 applies a signal to reference summer 62, which signal terminates communication between reference summer 62 and each of switches 58 and 60. A predetermined minimum "lockout" voltage, below which control of reference summer 62 resides in peak lock comparator 88, is established by resistors R47, R25, and R24 of comparator 88 in conjunction with a 15 volt supply voltage. A linear voltage comparator A5 compares this lockout voltage to second iteration arc voltage Varc$_2$ (from differential amplifier circuit 42) to determine whether peak lock comparator 88 or pulse width generator 52 should control reference signal $V_R$. When second iteration arc voltage Varc$_2$ is less than the lockout voltage, peak lock comparator 88 locks the output of reference summer 62 at a predetermined maximum level, thereby increasing the amount of power applied to wire 18 and, hence, decreasing the time required to initiate the arc plasma column.

Subsequent to arc initiation, arc voltage Varc rises above the lockout voltage, and control of reference summer 62 by peak lock comparator 88 is terminated. Simultaneously, control of reference summer 62 by switches 58 and 60 is re-established.

Pulse width generator 52 applies first timing signal $V_{T1}$ to switch 58 and second timing signal $V_{T2}$ to second timing switch 60. First timing signal $V_{T1}$ is representative of the duration (width) of the peak portion of reference signal $V_R$; second timing signal $V_{T2}$ is representative of the duration (width) of the background portion of reference signal $V_R$. The frequency associated with reference signal $V_R$ is determined by oscillator 50. The respective amplitudes of the peak and background portions of reference signal $V_R$, however, are largely independent of the foregoing frequency modulation components including oscillator 50, voltage regulator 46, and pulse width generator 52.

According to a further aspect of the preferred embodiment of the present invention, peak amplitude signal $V_p$ and background amplitude signal $V_b$ are varied as a function of feedback signal $V_I$. Feedback signal $V_I$ is representative of the current generated by power source 20 and applied to wire 18. Feedback signal $V_I$ may be characterized as the inferential wire feed rate, as discussed more fully below.

Referring now to FIGS. 3, 7-10 and 12, feedback signal $V_I$ is received at pin RC3C of two state filter 68. Feedback signal $V_I$ is a scaled representation, for example one volt for every 100 amperes, of the actual current delivered by power source 20 to wire 18. The two functional states of two state filter 68 will be described subsequently in conjunction with the description of state timer 70.

First iteration feedback signal VI$_1$ is output at pin 8 of filter 68. First iteration VI$_1$ represents the long term average current developed by power source 20 and applied to wire 18, i.e., the trend of the current signal which is generated by power source 20 in response to reference signal $V_R$. First iteration VI$_1$ is applied to pin 3 of peak delta selector 72 and to pin 16 of background delta selector 74.

Peak delta selector 72 comprises a processor U5, for example a 16 pin DIP CMOS digital multivibrator. In response to the three bit binary signal supplied by program selector 76 to respective pins 9-11 of peak processor U5, peak delta selector 72 selects one of respective output channels 0-7 corresponding to resistors R60-R67, respectively. Peak delta selector 72 applies first peak signal P$_1$ to peak reference summmer 82. As previously discussed, a second peak signal P$_2$ is also applied to peak reference summer 82 by minimum peak selector 78.

Resistors R60-R67 of peak delta selector 72 are selected such that a desired optimum time rate of change of peak amplitude signal $V_p$ is established for each program selection. Similarly, respective resistors R84-R91 of background delta selector 74 are selected to yield a desired optimum time rate of change of background amplitude signal $V_b$ for each program selection.

With continued reference to FIGS. 3, 7-9, and 12, minimum peak selector 78 comprises a processor U7 which may be equivalent to processor U5. In response to a three bit binary signal from program selector 76, processor U7 selects one of gates 0-7 corresponding to respective resistors R68-R72, respectively. Minimum peak selector 78 applies second peak signal P$_2$ to peak reference summer 82. The values of resistors R68-72 are selected so that second peak signal P$_2$ represents the minimum peak amplitude value corresponding to the particular program selected by the operator. Thus, regardless of the magnitude of first peak signal P$_1$ generated by peak delta selector 72 (P$_1$ may have a magnitude near zero in the event feedback signal $V_I$ is equal to zero), the output of peak reference summer 82 is at least as great as the minimum peak selector output (second peak signal $P_2$).

Peak reference summer 82 adds second peak signal $P_2$ (from minimum peak selector 78) to first peak signal $P_1$ (from peak delta selector 72) and applies the resulting combined signal to pin 11 of peak time switch 58.

In an analogous manner, program selector 76 applies a three bit binary signal to background delta selector 74 including a processor U9 which is preferably equivalent to processor U5 of selector 72. In response, first background signal $B_1$ is applied at one of respective gates 0–7 of processor U9. Similarly, program selector 76 applies a three bit signal to a processor U8 of minimum background selector 80, in response to which second background signal $B_2$ is applied through one of respective gates 0–7 of processor U8, corresponding to one of respective resistors R92–R96, respectively. First background signal B, and second background signal $B_2$ are applied to background reference summer 84.

Background reference summer 84 adds background signal B, first and second background signal $B_2$ together and applies the resulting combined signal to pin 14 of background time switch 60.

The peak and background amplitude signals $V_p$ and $V_b$ are thereafter combined into composite signal $V_c$ by reference summer 62 in synchrony with first and second timing signals $V_{T1}$ and $V_{T2}$, respectively, as discussed above.

In a typical GMAW proccess, spheres of molten metal are discharged from distal end 19 of wire 18 onto the weld site at workpiece 14. As the current through wire 18 increases, the amount of energy increases correspondingly, thereby accelerating the rate at which molten metal is discharged from the wire. It has been determined that the application of a square wave current pulse from power source 20 to wire 18, wherein the transitions between peak and background curent levels are essentially instantaneous, tends to expel the molten spheres from wire 18 in a violent manner. This turbulent discharge tends to impair the integrity of the weld.

More particularly, the molten metal forms a small puddle at the weld surface upon being discharged from wire 18. To the extent the rate at which the molten spheres are formed and the speed at which they are deposited into the melt puddle can be reduced while maintaining a desired burnoff rate, the quality of the resultant weld is concomitantly enhanced. A ramped transition between peak and background current levels, as opposed to a square wave pulse scheme, reduces melt puddle turbulence.

Figure 14:
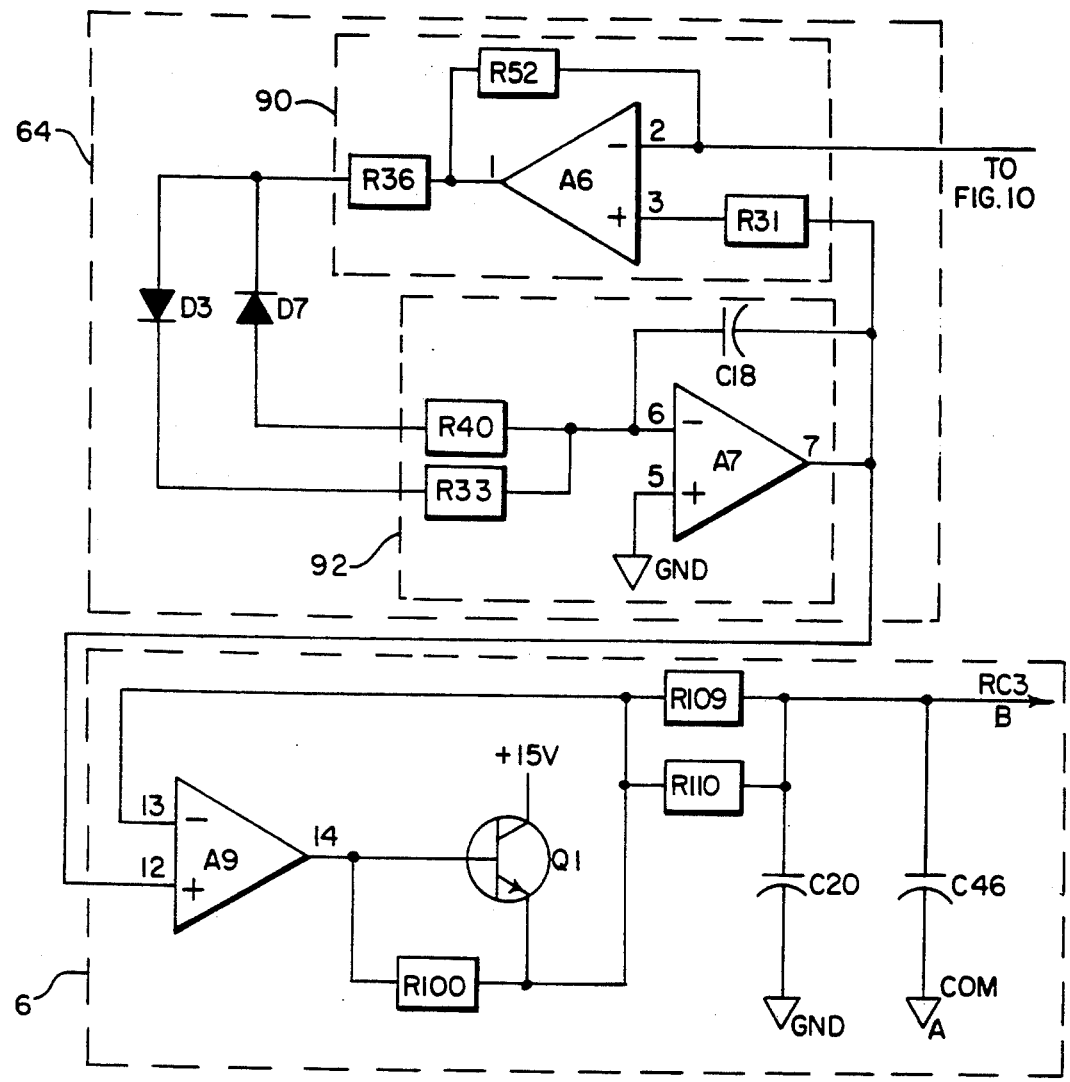
FIG. 14 is an electrical schematic representation of a ramp generator and an output buffer according to the present invention.

Referring now to FIGS. 3, 10, and 14, composite signal $V_c$ is generated at reference summer 62 and applied at pin 2 of ramp generator 64. Ramp generator 64 preferably includes a comparator circuit 90 comprising resistors R36, R31, R52 and an operational amplifier A6, for example an 8 pin JFET wide bandwidth linear amplifier. Ramp generator 64 further comprises an integrator circuit 92, including a capacitor C18, resistors R33 and R40, and an amplifier A7 of the same type as amplifier A6.

During the ramping function, the output of comparator circuit 90 is applied to pin 6 of amplifier A7. The output of amplifier A7 is applied to output buffer 66, as described below. In addition, the output of amplifier A7 is also applied as a feedback signal, through resistor R31, to pin 3 of amplifier A6.

Comparator circuit 90 compares the voltages at pins 2 and 3 of amplifier A6. When the voltages at pins 2 and 3 are equal, indicating that either the peak or background portion of composite signal $V_c$ is being transmitted through ramp generator circuit 64, the ramp generator functions as a unity gain filter; that is, the output from ramp generator 64 is equal to the output from reference summer 62.

When the voltage at pin 2 of amplifier A6 changes from the peak to the background portion of composite signal Vc, the output at pin 7 of amplifier A7 and, hence, the feedback signal at pin 3 of amplifier A6, remains at the peak voltage value for a brief period.

In response to this differential input, i.e., the voltage level at pin 3 being higher than that at pin 2, comparator 90 drives the value at pin 1 low, for example to −15 volts. Current then flows through a diode D7 from pin 6 to pin 1. In response to current flow to pin 1, integrator 92 produces an output at pin 7 which is an integral function of the current through diode D7. The output at pin 7 continues to decrease until the voltages at pins 2 and 3 of amplifier A6 are again equal. Thereafter, the output at pin 7 of ramp generator 64 equals the input at pin 2 of ramp generator 64 for the duration of the background portion of composite signal $V_c$.

When the input to ramp generator 64 (from reference summer 62) goes high, indicating a transition from the background portion to peak portion of composite signal $V_c$, comparator 90 detects a transient difference between the voltages at pins 2 and 3 of amplifier A6. In response, pin 1 is driven high, for example to +15 volts. Current thus flows into integrator 92 through a diode D3, and amplifier A7 produces an output which is a function of the current through diode D3. This rate of change corresponds to the desired "ramp" between the peak and background portions of first iteration composite signal $Vc_1$.

Figure 15:
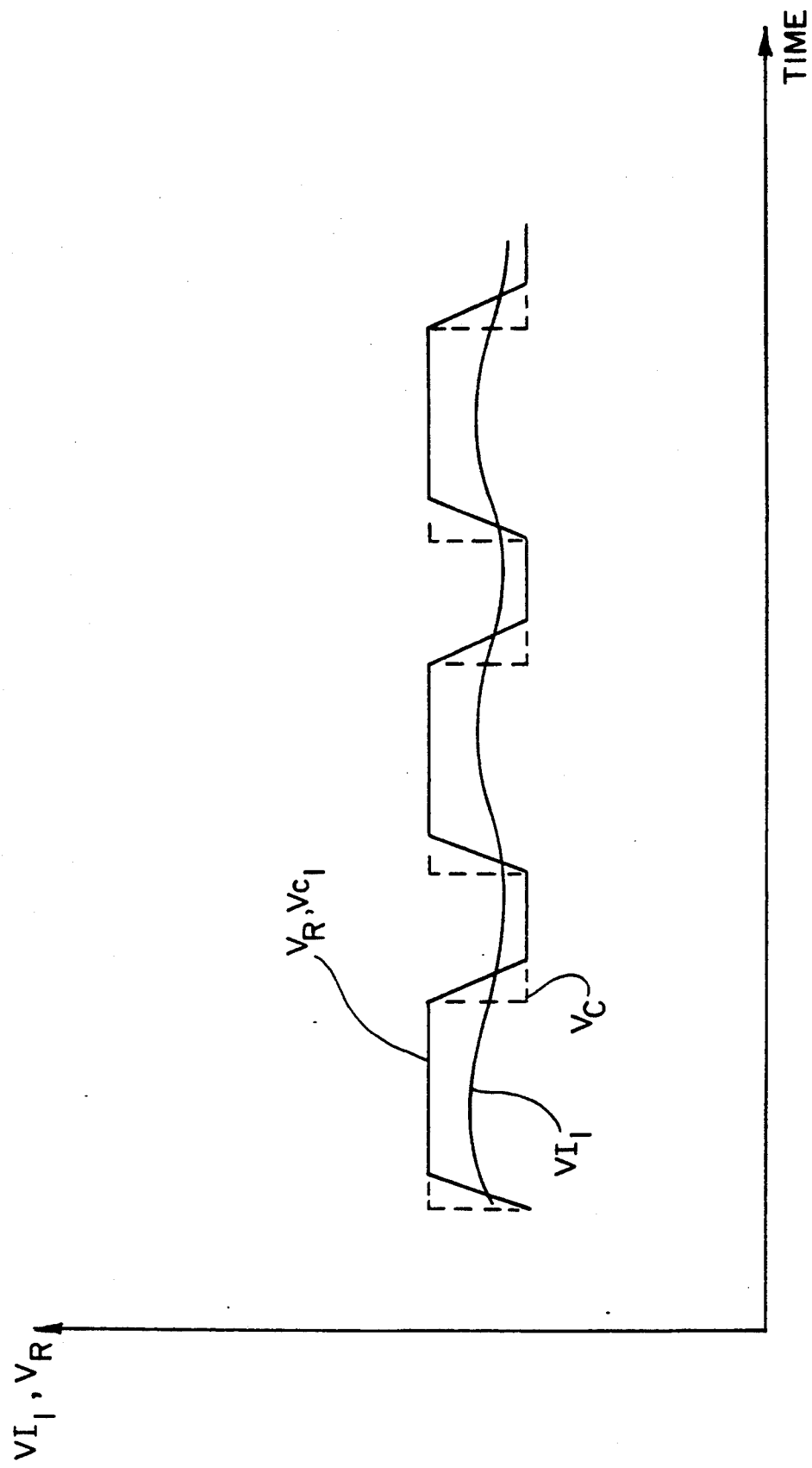
FIG. 15 is a graphical representation of the reference voltage signal and a current feedback signal according to a preferred embodiment of the present invention.

As best seen in FIG. 15, the square wave composite signal $V_c$ coming into ramp generator 64 from reference summer 62 is converted into the trapezoidal first iteration $Vc_1$ at pin 7 of integrator 92. First iteration composite signal $Vc_1$ has the same frequency, peak amplitude, and background amplitude as composite signal $V_c$, but first iteration composite signal $Vc_1$ has sloped transitions rather than the instantaneous transitions associated with a square wave signal.

Consequently, the peak level of first iteration composite signal $Vc_1$ (as determined by peak reference summer 82) is not attained until a short time after the peak portion of composite signal $V_c$ is initiated (by pulse width generator 52) due to the delay associated with the ramped transition. Accordingly, it is necessary to delay the sampling of second iteration arc voltage $Varc_1$ by sample and hold circuit 44 until the ramping function is complete, as will now be described in conjunction with FIGS. 3 and 4.

Peak sample timer 56 receives third timing signal $V_{T3}$ from pulse width generator 52 at the termination of the background portion of each cycle of composite signal $V_c$ (which corresponds to the beginning of the peak portion of the next cycle). Processor U3 of sample timer 56 then initiates a predetermined delay period before generating a request to sample and hold circuit 44 to sample second iteration arc voltage $Varc_2$. This predetermined delay time is calculated to be precisely equal to or slightly greater than the duration of the ramping function performed by ramp generator 64. In this manner, the "sample" function of sample and hold circuit 44 is not performed until second iteration arc voltage Varc achieves a peak voltage level, i.e., after the upwardly sloping ramp is completed.

Returning now to FIGS. 3 and 14–15, first iteration composite signal $Vc_1$, produced by ramp generator 64, is applied to output buffer 66. Output buffer 66 comprises a transistor $Q_1$ and an amplifier A9, for example a quad precision linear operational amplifier. Output buffer 66 augments the current capability of first iteration composite signal $Vc_1$ and applies reference signal $V_R$ at RC3 pin B. The enhanced current capability provided by ouput buffer 66 allows reference signal $V_R$ to overcome the inductance associated with umbilical cable 38 between controller 22 and power source 20.

Reference signal $V_R$ is applied to power source 20. In response, power source 20 generates a current signal as a linear function of reference signal $V_R$. Power source 20 then applies this current signal to wire 18.

Figure 7:
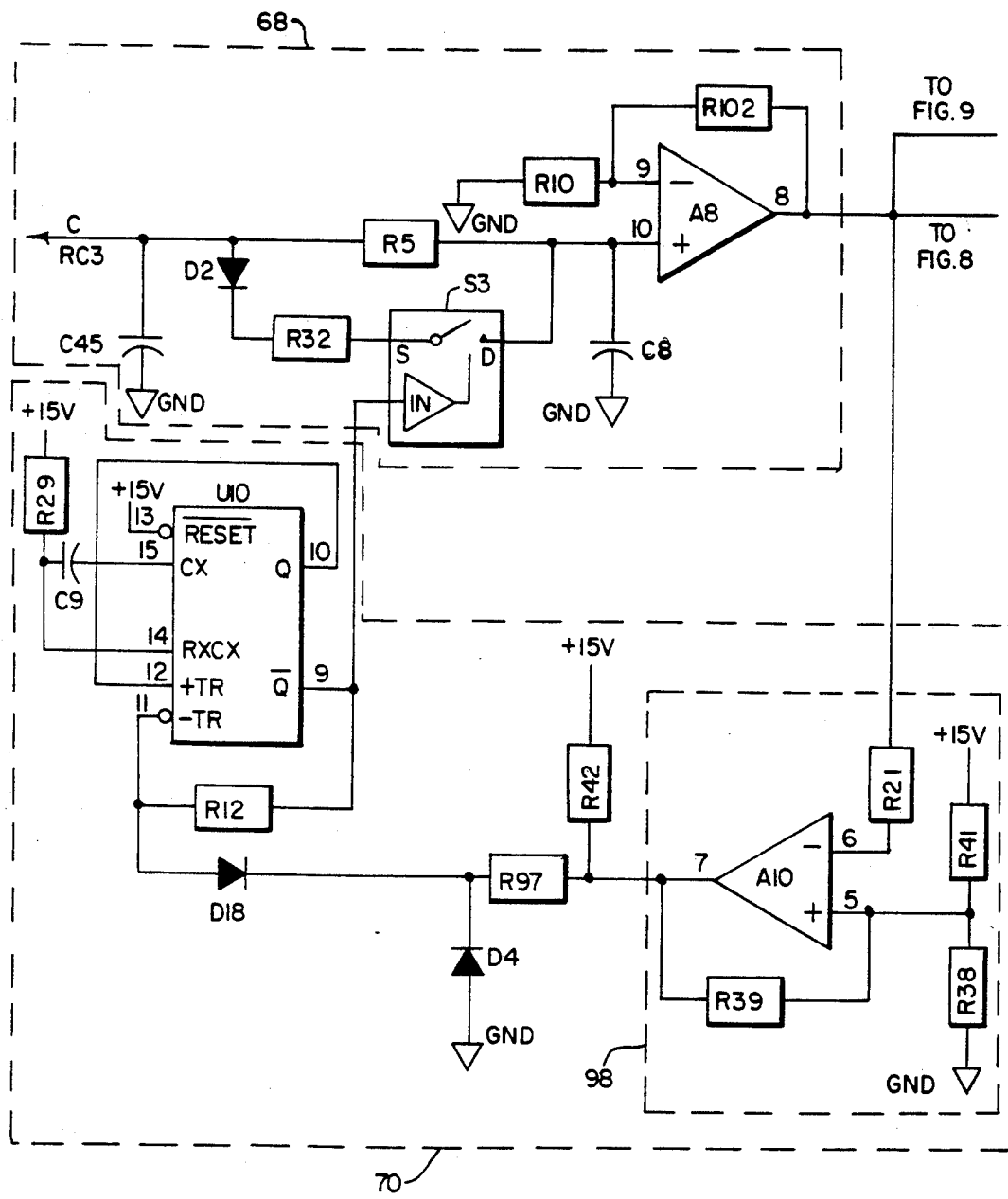
FIG. 7 is an electrical schematic representation of a two state analog filter and a state timer according to the present invention.
Figure 8:
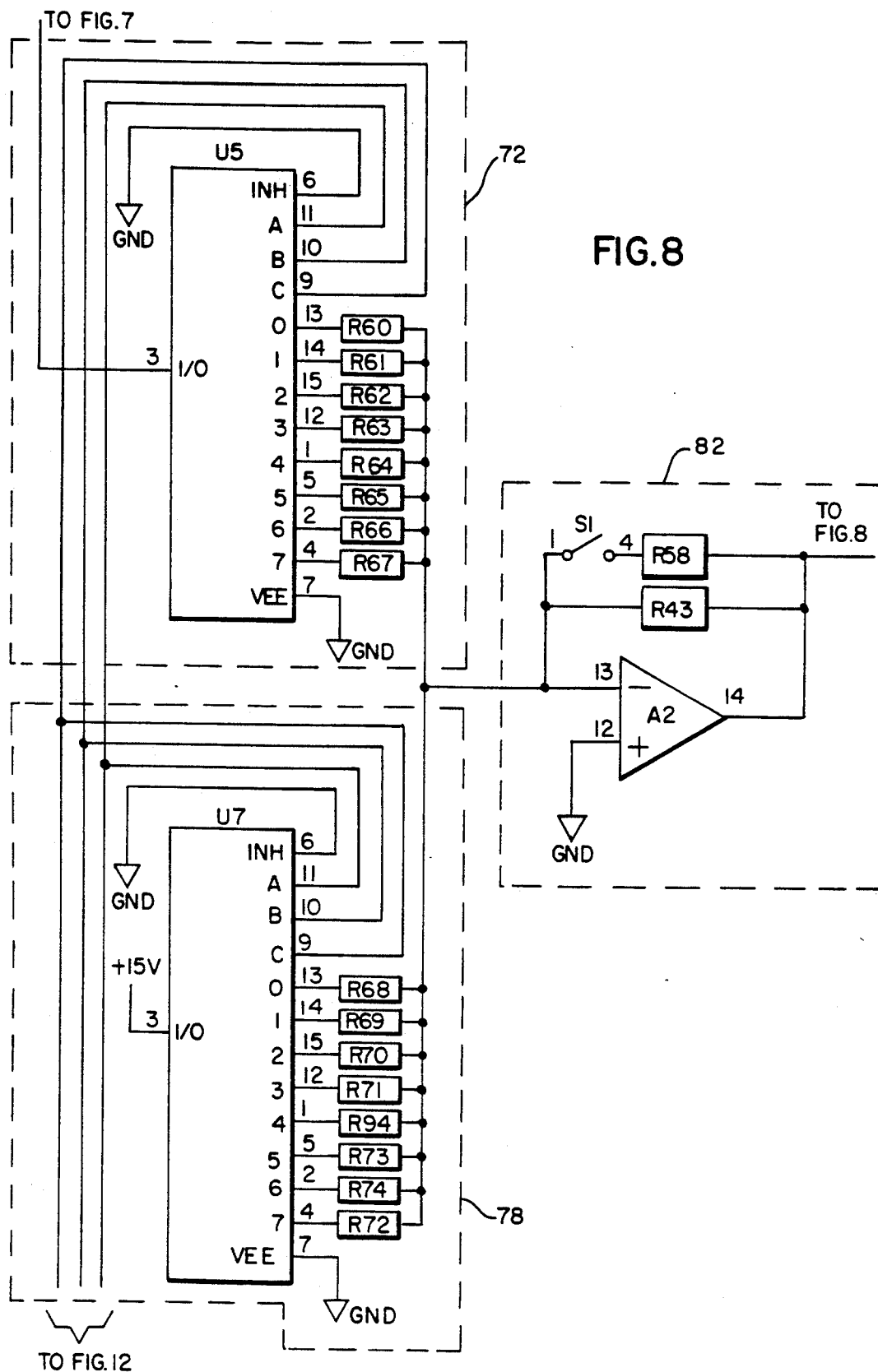
FIG. 8 is an electrical schematic representation of a peak delta selector, a minimum peak selector, and a peak reference summer according to the present invention.
Figure 9:
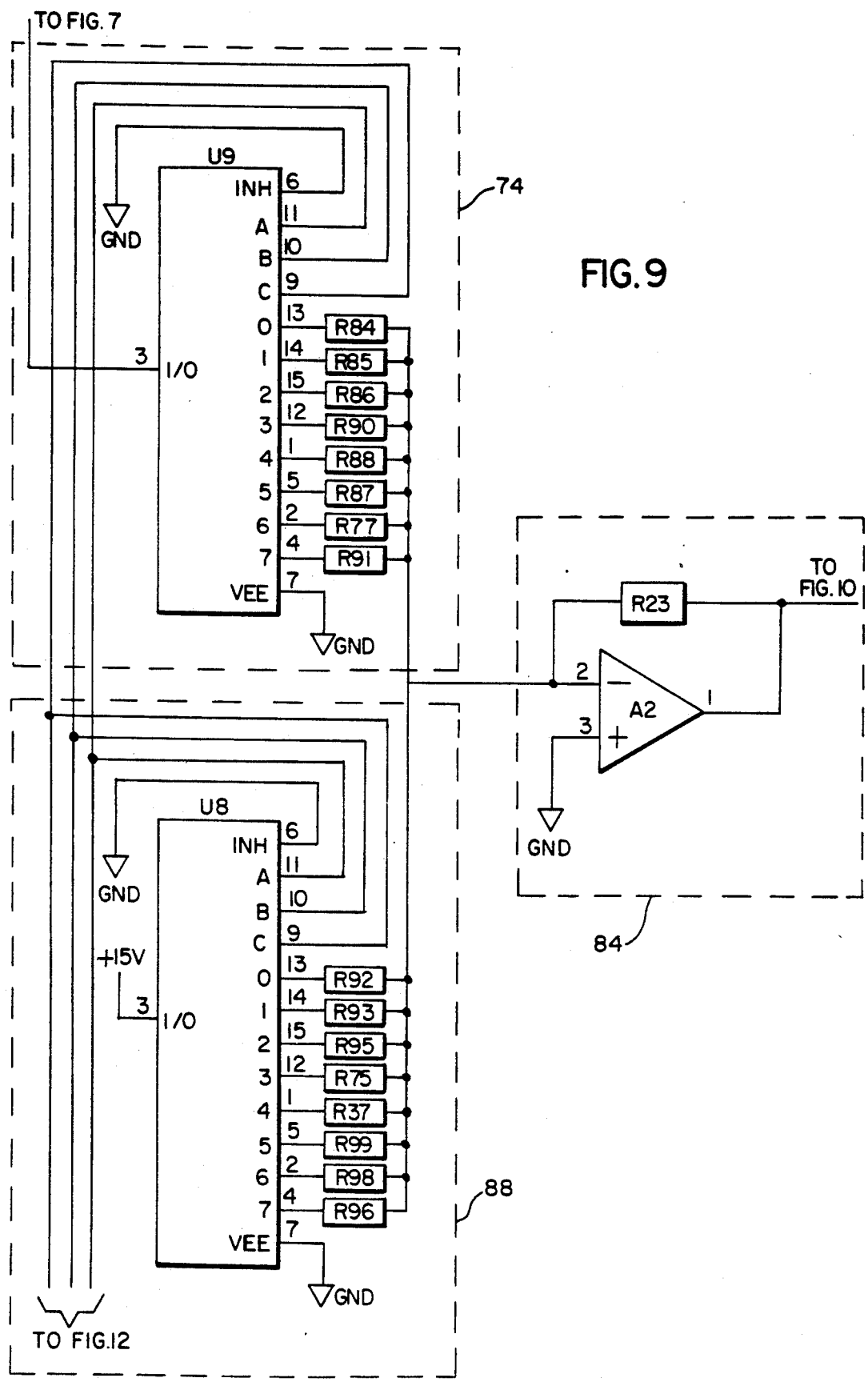
FIG. 9 is an electrical schematic representation of a background delta selector, a minimum background selector and a background reference summer according to the present invention.

With reference now to FIGS. 3 and 7, two state filter 68 and state timer 70 cooperate to provide enhanced arc initiation capability. Feedback signal $V_I$ enters two state filter 68 at RC3 pin C. Feedback signal $V_I$ comprises a pulsed signal representative of the current applied to wire 18 by power source 20 and, as such, comprises a series of alternating high and low voltage levels. Since the function of two state filter 68 is to produce an output representative of the long-term average current trend in wire 18, it is desirable to convert the pulsed feedback signal $V_I$ to a relatively constant first iteration feedback signal $VI_1$ representative of the average value of feedback signal $V_I$.

The averaging scheme employed by two state filter 68 includes a very rough integration, wherein various filtering components, including respective capacitors C45 and C8 resistors R5, R10, and R102, comprise a filter having a relatively large time constant. As such, the voltage on capacitor C8 does not change significantly between the peak and the background portions of the signal. With momentary reference to FIG. 15, the output signal produced by filter 68, namely, first iteration feedback signal $VI_1$, constitutes a rough average of the trapezoidal reference signal $V_R$ (and hence, feedback signal $V_I$ as applied to two state filter 68).

More particularly, feedback signal $V_I$ is applied to pin 10 of an amplifier A8, which amplifier may be equivalent to amplifier A1. Amplifier A8 applies first iteration feedback signal $VI_1$ at pin 8. In the steady state configuration illustrated in FIG. 7, filter 68 exhibits a relatively long time constant with respect to the rate of decay of the voltage on capacitor C8. During steady state operation, a switch S3, preferabaly a dual CMOS interface analog switch, remains open. With switch S3 open, a resistor R32 and a diode D2 are isolated from the filter circuitry. When switch S1 is closed, diode D2 and resistor R32 are brought into the filter circuit, such that resistors R32 and R5 assume a parallel configuration. This has the effect of drastically reducing the time constant associated with the rate of decay of the voltage stored at capacitor C8. Accordingly, the voltage at pin 8 of two state filter 68 is capable of more rapid transitions when switch S3 is closed.

Prior to arc initiation, the current through arc 30 is zero, so that feedback signal $V_I$ is also zero. When the operator contacts workpiece 14 with wire 18 to initiate the arc, a short circuit results at the wire/workpiece interface, and arc voltage Varc is instantly driven to zero. In response, the frequency modulation components attempt to drive the frequency of reference signal $V_R$ high in order to increase the current in wire 18. As the current in wire 18 increases, molten metal is liberated from wire 18 and the arc length increases. Arc voltage Varc increases linearly with arc length until it approaches the desired arc voltage $V_{sp}$.

Prior to arc initiation, however, the arc current is approximately zero. Thus, the peak and background amplitude signals $V_b$ and $V_p$ applied to peak and background time switches 58 and 60, respectively, are essentially determined by minimum peak selector 78 and minimum background selector 80. That is, the respective outputs from peak reference summer 82 and background reference summer 84 are solely determined by respective second peak and background signals $P_2$ and $B_2$. This is because the output of peak and background delta selectors 72 and 74, respectively, is essentially zero as long as first interation $VI_1$ is essentially zero. Recall that prior to arc initiation, no current is applied to wire 18 and, hence, feedback signal $V_I$ is zero.

To the extent the duration of arc initiation may be minimized, weld quality may be enhanced. Thus, it is desirable to rapidly increase the output of peak and background reference summers 58, 60 during arc initiation.

According to a further aspect of the preferred embodiment of the present invention, state timer 70 senses a low value of first iteration feedback signal $VI_1$, i.e., the input to peak delta selector 72 and background delta selector 74. In response to a low value of first iteration feedback signal $VI_1$, state timer 70 closes switch S3 of two state filter 68 to decrease the time constant associated with capacitor C8. As a result, the rate at which first iteration feedback signal $VI_1$ may increase during arc initiation is greatly increased.

More specifically, switch S3 is typically open prior to arc initiation so that two state filter 68 exhibits a relatively long time constant. A comparator 98, including a dual input voltage comparator A10 and respective resistors R21, R38, R39, and R41, compares the value of first iteration feedback signal $VI_1$ with a predetermined minimum switching value determined by resistors R41, R38 and a +15 volt supply voltage. In the event first iteration $VI_1$ is less than the predetermined minimum switching value, the output of amplifier A10 (pin 7) is driven to a low state, for example minus 15 volts. The output at pin 7 is applied to a processor U10, which may be equivalent to processor U2. In response, processor U10 closes switch S3, thereby decreasing the time constant associated with capacitor C8. This permits first iteration feedback signal $VI_1$ to rise rapidly to quickly bring the output of peak delta selector 72 and background delta selector 74 into the steady state operating range.

A capacitor C9 and a resistor R29 associated with processor U10 define a time constant which determines the length of time switch S3 remains closed. The value of resistor R29 and capacitor C29 are selected to ensure that switch S3 remains closed for an amount of time sufficient to ensure proper arc initiation. At the conclusion of the predetermined arc initiation time period, processor U10 terminates the signal to switch S3 and switch S3 opens, returning two state filter 68 to the steady state condition.

Figure 13:
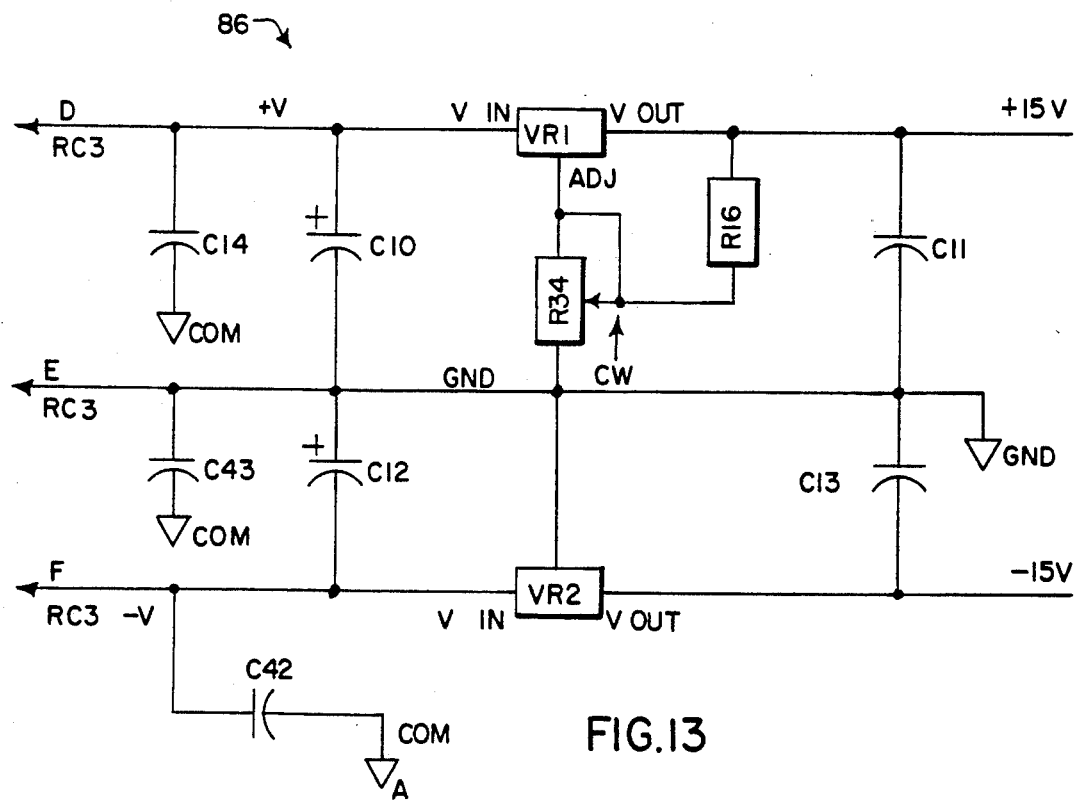
FIG. 13 is an electrical schematic representation of a power supply according to the present invention.

Returning now to FIG. 13, a 15 volt power supply circuit 86 provides operating power for the foregoing components. Unregulated DC voltage, for example plus or minus 24 volts DC, enters controller 22 at RC3 pins D and F. RC3 pin E is operatively connected to circuit common of the circuit board comprising controller 22 to provide a common reference for all circuitry.

Referring now to FIGS. 1–4 and 11, a mechanism for protecting tool 12 will now be described according to a further aspect of the present invention.

From time to time during the course of the GMAW process, one or more of first and second electrodes 32, 34 or remote sensing leads 36 may fail to function properly. For example, one of first and second electrodes 32, 34 may be improperly attached to either workpiece 14 or to wire 18 such that the electrode is inadvertently removed from its intended contact site during operation. Alternatively, the electrode may maintain mechanical contact but not provide an adequate electrical transmission path. In addition, remote sensing lead 36 may simply fail to properly conduct. Failure of the arc voltage detection mechanism provided by electrodes 32, 34 and sensing leads 36 results in a zero value of second iteration arc voltage $V_{arc_2}$ at pin 8 of differential amplifier 42.

In the event system 10 fails to detect arc voltage $V_{arc}$ during steady state operation, voltage regulator 46 will drive the output frequency of oscillator 50 high to compensate for the low value of arc voltage $V_{arc}$. In addition, peak lock comparator 88 may also cause the output of reference summer 62 to output a maximum voltage to compensate for an apparently low arc voltage. A sustained condition of high frequency or high amplitude current through wire 18 may damage the tip of tool 12. In such a situation, totally unsatisfactory weld performance results.

Protection circuit 94 detects failures in the arc voltage sensing mechanism. In response, protection circuit 94 forces reference signal $V_R$ to a minimum, for example, to the value of background amplitude signal $V_b$. More specifically, a failure signal VF is applied to protection circuit 94 via a failure lead RC3A. Failure lead RC3A, in turn, receives a signal from power source 20 representative of the voltage level at wire electrode 32.

During normal operation with electrodes 32, 34 and remote sensing leads 36 intact, the voltage at wire 18 is essentially equal to the output voltage at power source 20, except for relatively insignificant ohmic transmission losses. In the event one or both of electrodes 32, 34 are damaged, and further in the event one of remote sensing leads 36 fails, the value of failure signal $V_F$ is unaffected. Thus, failure signal $V_F$ represents the approximate arc voltage regardless of whether the arc voltage sensing mechanism is functioning properly.

Figure 11:
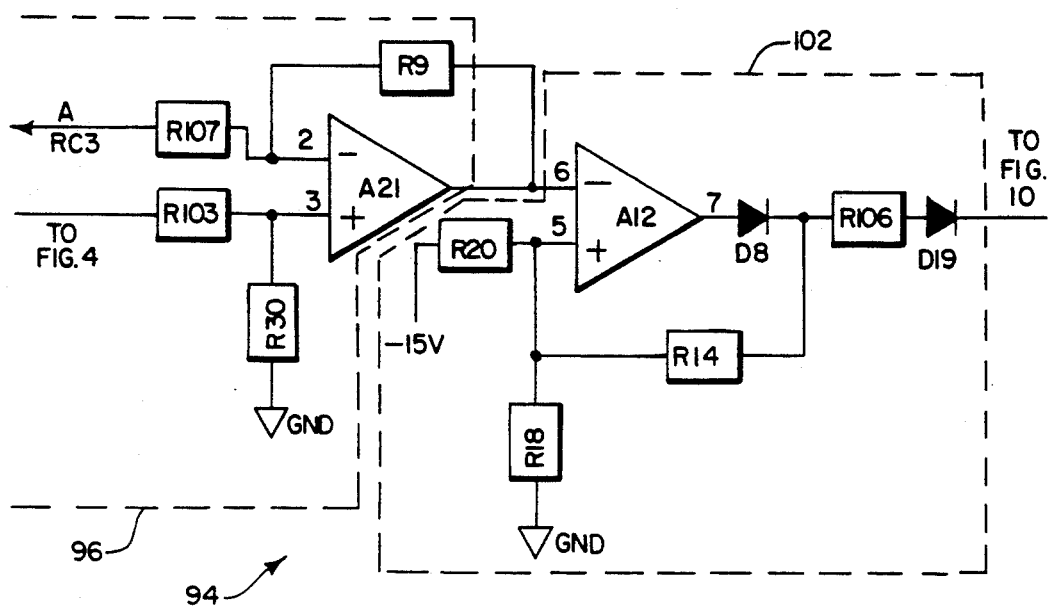
FIG. 11 is an electrical schematic of a protection circuit according to the present invention.
Figure 12:
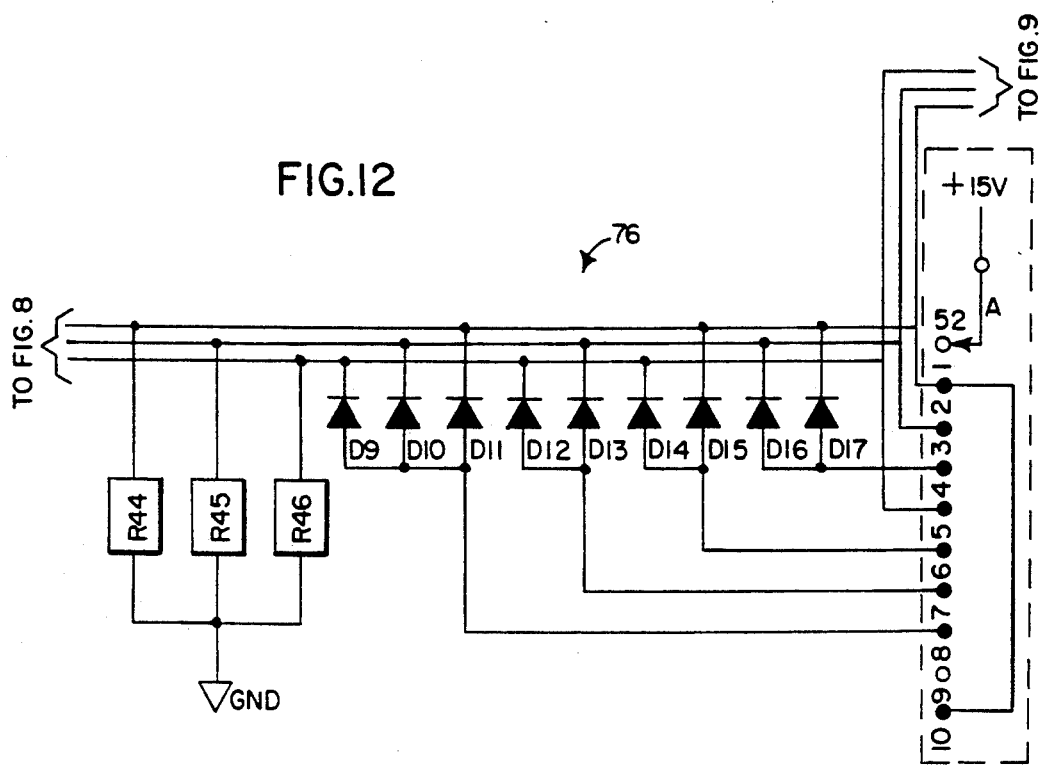
FIG. 12 is an electrical schematic representation of a program selector according to the present invention.

With continued reference to FIG. 11, failure signal $V_F$ is applied to pin 2 of a comparator 96 comprising respective resistors R30, R9, R103, R107 and an amplifier A21 which may be equivalent to amplifier A1. Second iteration arc voltage $V_{arc_2}$ is applied to pin 3 of amplifier A21. Comparator 96 subtracts failure signal $V_F$ from second iteration arc voltage $V_{arc_2}$ and applies a signal representative of the difference at pin 6 of a level detector 102. Level detector 102 comprises an amplifier A12 and resistors R14, R18, and R20. Amplifier A12 is preferably equivalent to amplifier A21. The voltage at pin 6 of amplifier A12 is compared to a threshold voltage at pin 5 thereof, which threshold voltage level is a predetermined value between zero and fifteen volts, as determined by resistors R14, R18, and R20.

If the voltage at pin 6 of level detector 102 does not exceed the predetermined threshold at pin 5, indicating that arc voltage $V_{arc}$ is approximately equal to or less than failure signal $V_F$, the output produced at pin 7 will be insufficient to overcome the bias associated with respective diodes D8 and D9. Consequently, control system 10 maintains normal operation.

If, on the other hand, the voltage at pin 6 of amplifier A12 exceeds the predetermined threshold at pin 5, protection circuit 94 applies a signal, through respective diodes D8, D19 and resistor R106, to reference summer 62 to drive reference signal $V_R$ to a minimum value.

In this manner, the current applied to wire 18, and hence, the arc voltage $V_{arc}$ is driven to a minimum to avoid damage to the welding equipment in the event one or more of remote voltage sensing leads 36 and first and second electrodes 32, 34 fails to function properly.

It will be understood that, while various of the conductors (connections) are shown in the drawing as single lines, they are not shown in a limiting sense, and may comprise plural conductors (connections), as is understood in the art. Further, the above description is of preferred exemplary embodiments of the present invention, and the invention is not limited to the specific forms shown. For example, respective gates 0-7 of peak delta selector 72, background delta selector 74, minimum peak selector 78, and minimum background selector 80 illustratively comprise a conduction path including a linear resistor. Alternatively, these resistors may be replaced with integrated circuits such that the output from respective circuits 72, 78, 74, and 80 comprise a nonlinear function of the inputs thereto. Such a structure would provide enhanced programming flexibility and permit the control system to more closely accommodate observed weld data for particular wire feed rates, wire sizes, and wire materials.

In addition, a large portion of the analog circuitry disclosed herein may be replaced by a micro controller configured to execute an algorithm based on predetermined program values. For example, voltage regulator 46, sample and hold circuit 44, ramp generator 64, two state filter 68, oscillator 50, pulse width generator 52, peak sample timer 56, peak lock comparator 88, and the various selectors discussed herein may be modified or replaced by one or more microcontrollers.

These and other modifications may be made in the design and arrangement of the elements discussed herein without departing from the spirit and scope of the invention, as expressed in the appended claims.

We claim:

1. An arc welding controller for controlling the arc length between the end of a consumable wire electrode and a workpiece configured to be welded thereby, said controller being of the type configured to apply a reference voltage signal to a power source, in response to which the power source applies a pulsed current signal to the wire electrode in accordance with said reference voltage signal, said controller comprising:
    differential means for sensing the actual arc voltage and generating an arc signal representative thereof;
    set point means for generating a set point signal indicative of a desired arc voltage;
    regulator means for comparing said arc signal with said set point signal and generating a delta signal indicative of the difference therebetween;
    oscillator means for generating, in response to said delta signal, a periodic signal, the frequency of which is a predetermined function of the magnitude of said delta signal;
    feedback means for generating a feedback signal indicative of the magnitude of the current in the wire electrode;

level means for generating, in response to said feedback signal, a peak signal and a background signal; and summer means, responsive to said level means and said oscillator means, for generating said reference voltage signal including a peak portion and a background portion, the respective amplitudes of which are a function of said peak and background signals, respectively.

2. The controller of claim 1, wherein said differential means comprises:
first circuit means for comparing a first voltaic potential, associated with the workpiece, with a second voltaic potential associated with the wire electrode and generating a pulsed signal indicative of the difference therebetween and comprising respective high and low amplitude portions;
sample means, responsive to said pulsed signal, for generating and selectively applying said arc signal, indicative of said high amplitude portion of said pulsed signal, to said regulator means.

3. The controller of claim 1, further comprising program means for generating a control signal representative of one of a plurality of programs having associated therewith, respectively, a peak parameter, a background parameter, and a pulse parameter.

4. The controller of claim 3, further comprising generator means for imparting a predetermined peak pulse width and a predetermined background pulse width to said reference voltage signal, said generator means including pulse width selector means, cooperating with said program means, for generating a pulse width signal indicative of said predetermined peak and background pulse widths in accordance with said pulse parameter.

5. An arc welding controller for controlling the arc length between the end of a consumable wire electrode and a workpiece configured to be welded thereby, said controller being of the type configured to apply a reference voltage signal to a power source, in response to which the power source applies a pulsed current signal to the wire electrode in accordance with said reference voltage signal, said controller comprising:
differential means for sensing the actual arc voltage and generating an arc signal representative thereof;
set point means for generating a set point signal indicative of a desired arc voltage;
regulator means for comparing said arc signal with said set point signal and generating a delta signal indicative of the difference therebetween;
oscillator means for generating, in response to said delta signal, a periodic signal, the frequency of which is a predetermined function of the magnitude of said delta signal;
feedback means for generating a feedback signal indicative of the magnitude of the current in the wire electrode;
level means for generating, in response to said feedback signal, a peak signal and a background signal;
summer means, responsive to said level means and said oscillator means, for generating said reference voltage signal including a peak portion and a background portion, the respective amplitudes of which are a function of said peak and background signals, respectively; and
wherein said feedback means comprises:
a first filter for use during steady state operation, said first filter exhibiting a first time constant such that said feedback signal has associated therewith a first predetermined rate of change; and
a second filter for use during arc initiation, said second filter exhibiting a second time constant such that said feedback signal has associated therewith a second predetermined rate of change greater than said first predetermined rate of change.

6. The controller of claim 5, wherein said level means comprises:
peak means, responsive to said program means, for generating said peak signal in accordance with said peak parameter; and
background means, responsive to said program means, for generating said background signal in accordance with said background parameter.

7. The controller of claim 6, wherein said peak means comprises:
a peak delta selector circuit including a first input disposed to receive said feedback signal, a second input disposed to receive said control signal, and a plurality of first output gates, corresponding to said plurality of programs, respectively, disposed to transmit a peak delta output signal;
a minimum peak selector circuit including a third input disposed to receive said control signal, and a plurality of second output gates, corresponding to said plurality of programs, respectively, disposed to transmit a minimum peak output signal; and
peak summing means for combining said peak delta output signal and said minimum peak output signal to form said peak signal.

8. The controller of claim 7, wherein said background means comprises:
a background delta selector circuit including a first input disposed to receive said feedback signal, a second input disposed to receive said control signal, and a plurality of first output gates, corresponding to said plurality of programs, respectively, disposed to transmit a background delta output signal;
a minimum background selector circuit including a third input disposed to receive said control signal, and a plurality of second output gates, corresponding to said plurality of programs, respectively, disposed to transmit a minimum background output signal;
background summing means for combining said background delta output signal and said minimum background output signal to form said background signal.

9. The controller of claim 5, further comprising;
peak switch means, having a first input for receiving said peak signal and a second input for receiving said peak width signal from said generator means, for generating a peak reference signal having an amplitude and a duration corresponding to the peak portion of said reference voltage signal;
background switch means, having a first input for receiving said background signal from said level means and a second input for receiving said background width signal from said generator means, for generating a background reference signal having an amplitude and a duration corresponding to the background portion of said reference voltage signal; and
reference summer means, responsive to said peak switch means and said background switch means, for combining said peak reference signal and said background reference signal into a composite wave form comprising said reference voltage signal.

10. The controller of claim 9, wherein said generator means further comprises timer means, including:

a first input for receiving said pulse width signal from said pulse width selector means;

a first output disposed to transmit said peak width signal to said first input of said peak switch means;

a second output disposed to transmit said background width signal to said first input of said background switch; and a third output disposed to transmit a sample signal to said sample means.

11. The controller of claim 10, wherein:

said sample means includes a sample timer having a first input for receiving said sample signal from said timer means, a second input for receiving said arc signal, and an output for applying said sampled signal to said regulating means in accordance with said sample signal and said arc signal.

12. An arc welding controller for controlling the arc length between the end of a consumable wire electrode and a workpiece configured to be welded thereby, said controller being of the type configured to apply a reference voltage signal to a power source, in response to which the power source applies a pulsed current signal to the wire electrode in accordance with said reference voltage signal, said controller comprising:

differential means for sensing the actual arc voltage and generating an arc signal representative thereof;

set point means for generating a set point signal indicative of a desired arc voltage;

regulator means for comparing said arc signal with said set point signal and generating a delta signal indicative of the difference therebetween;

oscillator means for generating, in response to said delta signal, a periodic signal, the frequency of which is a predetermined function of the magnitude of said delta signal;

feedback means for generating a feedback signal indicative of the magnitude of the current in the wire electrode;

level means for generating, in response to said feedback signal, a peak signal and a background signal;

summer means, responsive to said level means and said oscillator means, for generating said reference voltage signal including a peak portion and a background portion, the respective amplitudes of which are a function of said peak and background signals, respectively; and a peak lock circuit having a first input for receiving said arc signal and a first output for applying a lock signal to said summer means when the magnitude of said arc signal is less than a predetermined minimum value, in response to which said reference summer overrides said peak signal, said background signal, and said periodic frequency train and generates an override output signal.

13. An arc welding controller for controlling the arc length between the end of a consumable wire electrode and a workpiece configured to be welded thereby, said controller being of the type configured to apply a reference voltage signal to a power source, in response to which the power source applies a pulsed current signal to the wire electrode in accordance with said reference voltage signal, said controller comprising:

differential means for sensing the actual arc voltage and generating an arc signal representative thereof;

set point means for generating a set point signal indicative of a desired arc voltage;

regulator means for comparing said arc signal with said set point signal and generating a delta signal indicative of the difference therebetween;

oscillator means for generating, in response to said delta signal, a periodic signal, the frequency of which is a predetermined function of the magnitude of said delta signal;

feedback means for generating a feedback signal indicative of the magnitude of the current in the wire electrode;

level means for generating, in response to said feedback signal, a peak signal and a background signal;

summer means, responsive to said level means and said oscillator means, for generating said reference voltage signal including a peak portion and a background portion, the respective amplitudes of which are a function of said peak and background signals, respectively;

program means for generating a control signal representative of one of a plurality of programs having associated therewith, respectively, a peak parameter, a background parameter, and a pulse parameter; and generator means for imparting a predetermined peak pulse width and a predetermined background pulse width to said reference voltage signal, said generator means including pulse width selector means, cooperating with said program means, for generating a pulse width signal indicative of said predetermined peak and background pulse widths in accordance with said pulse parameter;

wherein:

said reference voltage signal comprises a square wave pulse train, and wherein said controller further comprises:

ramp means, responsive to said summer means, for interposing a first ramped voltage signal, which signal comprises an increasing function of voltage with respect to time and having a first predetermined duration, following said background portion and preceding said peak portion of said square wave pulse train, and for interposing a second ramped voltage signal, which signal comprises a decreasing function of voltage with respect to time and having a second predetermined duration, following said peak portion and preceding said background portion of said square wave pulse train; and a sample circuit, having a first input disposed to receive said pulsed signal, a second input disposed to receive said pulse width signal indicative of the beginning of said peak portion of said square wave pulse train, and a first output disposed to apply said sampled signal to said regulator means, said sample circuit being configured to sample said peak portion of said arc signal said first predetermined duration after receiving said pulse width signal.

14. A method of generating a voltage reference signal for use in controlling the arc voltage between the end of a consumable wire electrode and a workpiece to be welded thereby, comprising the steps of:

measuring the actual arc voltage and generating an arc voltage signal indicative thereof;

applying said arc voltage signal to a voltage regulator;

applying a set point signal, indicative of a desired arc voltage, to said voltage regulator;

comparing said set point signal and said arc voltage signal and generating a delta signal indicative of the magnitude of the difference therebetween;

generating an error signal, the frequency of which is function of the magnitude of said delta signal;

applying a feedback signal, indicative of the current level at said arc, to a peak amplitude selector and generating a peak amplitude signal in response thereto;

applying said peak amplitude signal and said error signal to a reference generator;

generating said reference voltage signal having a frequency which is a function of said error signal and having a peak portion, the amplitude of which is a function of said peak amplitude signal.

15. The method of claim 14 further comprising the steps of:

generating a peak width signal; and applying said peak width signal to said reference generator;

wherein said step of generating said reference voltage signal comprises generating, for at least one pulse comprising said pulsed signal, said reference voltage signal such that the duration of said peak portion is a function of said peak width signal.

16. The method of claim 14, further comprising the steps of:

applying said feedback signal to a background amplitude selector and generating a background amplitude signal in response thereto;

applying said background amplitude signal to said reference generator;

and wherein said step of generating said reference voltage signal further comprises generating a background portion of said reference voltage signal, said background portion having an amplitude which is a function of said background amplitude signal.

17. The method of claim 16, further comprising the steps of:

applying a control signal to said peak and background amplitude selectors such that the magnitude of said peak and background amplitudes comprise a predetermined function of said control signal.

18. The method of claim 17, further comprising the step of applying said control signal to a peak width selector and generating a peak width signal in response thereto;

and wherein said step of generating said reference voltage signal comprises generating a peak portion of said reference voltage signal, the duration of which comprises a function of said peak width signal.

19. The method of claim 18, further comprising the steps of:

applying said reference voltage signal to a voltage controlled current source;

converting said reference voltage signal to a current signal;

and thereafter applying said current signal to said consumable wire electrode.

20. A pulse mode arc welding system of the type including a voltage controlled current source configured to apply a current signal to a consumable wire electrode at a welding arc between the distal end of the wire electrode and a workpiece to be welded, wherein a reference voltage signal is generated by a controller and applied to said power source, the system comprising:

first and second remote voltage sensing leads disposed to sense first and second voltaic potentials associated with said electrode and said workpiece, respectively;

first amplifier means for comparing said first and second potentials and for generating an arc voltage signal indicative of the difference therebetween;

means for generating a set point signal indicative of the desired arc voltage;

means for comparing said arc voltage signal and said set point signal and for generating an error signal indicative of the difference therebetween;

means for selecting a reference frequency signal in accordance with the magnitude of said error signal;

filter means for generating a feedback signal indicative of the current level at said arc, said filter means including:

a first circuit having a first time constant associated therewith;

a second circuit having a second time constant associated therewith;

and a filter selection circuit for activating said first circuit and deactivating said second circuit when the magnitude of said feedback signal exceeds a predetermined threshold;

wherein said first and second circuits are configured to control the rate of change of said feedback signal and wherein said first time constant exceeds said second time constant;

means, responsive to said feedback signal, for generating a peak amplitude signal and a background amplitude signal;

peak means, responsive to said peak amplitude signal and said frequency signal, for generating a peak portion signal having a first predetermined amplitude and a first predetermined duration associated therewith;

background means, responsive to said background amplitude signal and said frequency signal, for generating a background portion signal having a second predetermined amplitude and a second predetermined duration associated therewith; and summing means, responsive to said peak portion signal and said background portion signal, for combining said peak and background portion signals to form said reference voltage signal comprising a peak portion having said first magnitude and duration associated therewith, and a background portion having said second magnitude and duration associated therewith.

21. An arc welding controller for controlling the arc length between the end of a consumable wire electrode and a workpiece configured to be welded thereby, the controller being of the type configured to apply a reference voltage signal to a power source, in response to which the power source applies a pulsed current comprised of a series of pulses, wherein the width of said pulses are adjusted in response to a measured voltage difference between the electrode and the workpiece, the improvement comprising:

level means for generating, in response to the measured voltage difference a peak signal and a background signal; and summer means, responsive to said level means for generating said reference voltage signal including a peak portion and a background portion, the respective amplitudes of which are a function of said peak and background signals, respectively.

* * * * *